US 12,251,598 B2

(12) United States Patent
Moreira et al.

(10) Patent No.: US 12,251,598 B2
(45) Date of Patent: Mar. 18, 2025

(54) SEAT ASSEMBLY SYSTEMS AND METHODS

(71) Applicant: PELOTON INTERACTIVE, INC., New York, NY (US)

(72) Inventors: Claudia Moreira, New York, NY (US); Mark Kruse, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 232 days.

(21) Appl. No.: 18/105,192

(22) Filed: Feb. 2, 2023

(65) Prior Publication Data

US 2023/0181967 A1 Jun. 15, 2023

Related U.S. Application Data

(63) Continuation of application No. 17/013,634, filed on Sep. 6, 2020, now Pat. No. 11,602,665.

(51) Int. Cl.
*A63B 22/00* (2006.01)
*A63B 22/06* (2006.01)

(52) U.S. Cl.
CPC ...... *A63B 22/0046* (2013.01); *A63B 22/0605* (2013.01); *A63B 2225/09* (2013.01)

(58) Field of Classification Search
CPC . A63B 22/0046; A63B 22/0605; A63B 69/16; A63B 2225/09; A63B 2225/093; B62J 1/08; B62K 19/36
See application file for complete search history.

(56) References Cited

U.S. PATENT DOCUMENTS

| | | | |
|---|---|---|---|
| 1,607,748 A | 11/1926 | Heinrich | |
| 2,174,340 A | 9/1939 | Werner | |
| 2,193,455 A | 3/1940 | Hayes | |
| 4,421,357 A | 12/1983 | Shimano | |
| 4,772,069 A | 9/1988 | Szymski | |
| 4,801,164 A * | 1/1989 | Mosch | E05C 3/046 |
| | | | 292/DIG. 47 |
| 4,836,604 A | 6/1989 | Romano | |
| 5,007,675 A | 4/1991 | Musto et al. | |
| 5,240,268 A | 8/1993 | Allsop et al. | |
| 5,244,301 A | 9/1993 | Kurke et al. | |
| 5,433,504 A | 7/1995 | Kao | |

(Continued)

FOREIGN PATENT DOCUMENTS

| | | | | |
|---|---|---|---|---|
| AU | 2014100465 A4 * | 6/2014 | ............... | B62J 1/08 |
| FR | 2996516 A1 * | 4/2014 | ............... | B62J 1/08 |

(Continued)

*Primary Examiner* — Gary D Urbiel Goldner
(74) *Attorney, Agent, or Firm* — Haynes and Boone, LLP

(57) ABSTRACT

A seat assembly for adjustably connecting a seat to a seat post is provided. The seat assembly may include a slider configured to slide along the seat post, a cam coupled to the slider and movable between a first position and a second position, and a cam washer positioned between the cam and the slider. The cam washer may include a base seated within a cutout disposed in the slider, the base having a non-circular shape for engagement with a complementary shape of the cutout. The cam washer may include a tab extending from the base, the tab seated within the cam. Associated systems and methods are also provided.

20 Claims, 43 Drawing Sheets

(56) References Cited

U.S. PATENT DOCUMENTS

| | | | |
|---|---|---|---|
| 5,441,327 A | 8/1995 | Sanderson | |
| 5,513,895 A | 5/1996 | Olson et al. | |
| 5,855,410 A | 1/1999 | Lin | |
| 6,669,603 B1 | 12/2003 | Forcillo | |
| 6,932,745 B1 | 8/2005 | Ellis | |
| 6,948,878 B1 * | 9/2005 | Smith, Jr. | F16B 7/1418 70/261 |
| D532,063 S | 11/2006 | Kim et al. | |
| 7,322,645 B2 * | 1/2008 | Roizen | B62J 1/08 297/215.15 |
| 9,150,284 B2 * | 10/2015 | Pe | B25J 1/04 |
| 9,861,855 B2 | 1/2018 | Foley et al. | |
| 10,702,736 B2 | 7/2020 | Weston et al. | |
| 11,602,665 B2 * | 3/2023 | Moreira | B62K 19/36 |
| 2001/0008348 A1 | 7/2001 | Nelson | |
| 2002/0053818 A1 | 5/2002 | Williams et al. | |
| 2002/0056795 A1 | 5/2002 | Dal Pra' | |
| 2003/0141696 A1 | 7/2003 | Chao | |
| 2004/0245743 A1 | 12/2004 | Chao | |
| 2005/0017479 A1 * | 1/2005 | Liu | B62K 15/008 280/283 |
| 2005/0067863 A1 * | 3/2005 | Roizen | B62J 1/08 297/215.14 |
| 2005/0202938 A1 | 9/2005 | Goldberg | |
| 2005/0236802 A1 | 10/2005 | Bobrovniczky | |
| 2005/0239609 A1 | 10/2005 | Chen | |
| 2005/0253427 A1 | 11/2005 | Bertelloni | |
| 2007/0046081 A1 | 3/2007 | Shook | |
| 2007/0138846 A1 | 6/2007 | Ritchey | |
| 2008/0054689 A1 | 3/2008 | Tucker | |
| 2008/0096725 A1 | 4/2008 | Keiser | |
| 2008/0143153 A1 | 6/2008 | Lin | |
| 2008/0203782 A1 | 8/2008 | Bigolin | |
| 2009/0048076 A1 | 2/2009 | Irving et al. | |
| 2009/0127898 A1 | 5/2009 | Segato | |
| 2010/0041523 A1 | 2/2010 | Bingham et al. | |
| 2010/0052377 A1 | 3/2010 | Hsu et al. | |
| 2010/0080650 A1 | 4/2010 | Gorza | |
| 2010/0234185 A1 | 9/2010 | Watt et al. | |
| 2010/0314917 A1 | 12/2010 | Hsieh | |
| 2010/0327641 A1 | 12/2010 | Schranz | |
| 2012/0104811 A1 | 5/2012 | Hsieh | |
| 2013/0072356 A1 | 3/2013 | Machida et al. | |
| 2013/0207424 A1 | 8/2013 | Choi | |
| 2014/0038781 A1 * | 2/2014 | Foley | A63B 21/015 482/9 |
| 2014/0042725 A1 | 2/2014 | Lo | |
| 2014/0239682 A1 | 8/2014 | Tisue | |
| 2016/0114626 A1 * | 4/2016 | Schlanger | B60B 27/026 301/124.2 |
| 2017/0008586 A1 | 1/2017 | Danielson | |
| 2017/0106222 A1 | 4/2017 | Mayer et al. | |
| 2017/0217521 A1 | 8/2017 | Li | |
| 2018/0065707 A1 | 3/2018 | Salazar | |
| 2018/0297658 A1 | 10/2018 | Mercat | |
| 2018/0326255 A1 | 11/2018 | Schranz | |
| 2019/0039669 A1 | 2/2019 | McAndrews et al. | |
| 2019/0063489 A1 | 2/2019 | Basiliere | |
| 2019/0099626 A1 * | 4/2019 | Codega | A62B 1/14 |
| 2019/0100281 A1 | 4/2019 | Kawakami | |
| 2019/0217144 A1 | 7/2019 | Petrillo et al. | |
| 2020/0139188 A1 | 5/2020 | Johnson | |
| 2020/0247492 A1 | 8/2020 | Coaplen et al. | |
| 2020/0269084 A1 | 8/2020 | Rorie | |
| 2021/0052937 A1 * | 2/2021 | Chen | A63B 21/0428 |

FOREIGN PATENT DOCUMENTS

| | | | |
|---|---|---|---|
| FR | 3019139 A1 * | 10/2015 | B62J 1/08 |
| WO | WO-2018029491 A1 * | 2/2018 | B62K 19/36 |

* cited by examiner

SEAT ASSEMBLY SYSTEMS AND METHODS

CROSS-REFERENCE TO RELATED APPLICATIONS

This application is a continuation application of U.S. application Ser. No. 17/013,634, filed Sep. 6, 2020, the disclosure of which is incorporated herein by reference.

TECHNICAL FIELD

One or more embodiments relate generally to exercise equipment and, more particularly, to systems and methods for adjustably mounting a seat to a bicycle, such as an exercise bike or other exercise device.

BACKGROUND

Exercise devices, such as exercise bikes, rowers, and the like, often include a seat that is adjustable to fit the exercise device to users of different sizes and preferences. For example, the seat may be adjustably positioned closer to or further away from a handlebar as desired. Some mechanisms, however, make it difficult to reposition the seat, are not robust, and/or are counterintuitive.

Therefore, there is a need in the art for systems and methods that address the deficiencies noted above, other deficiencies known in the industry, or at least offers an alternative to current techniques.

SUMMARY

Systems and methods are provided for a seat assembly (e.g., a seat assembly that includes an adjustable slider assembly or mechanism) that provides an adjustable seat (e.g., for a bicycle such as an exercise bike or other type of exercise device). According to one or more embodiments of the present disclosure, a seat assembly may include a slider including an open end defined between a first arm and a second arm, and a cutout disposed in the first arm or the second arm. The seat assembly may further include a cam coupled to the slider and movable between a first position and a second position. The seat assembly may further include a saddle shaft coupled to the slider. The seat assembly may further include a cam washer positioned between the cam and the slider. The cam washer may include a base seated within the cutout disposed in the slider, the base having a non-circular shape for engagement with a complementary shape of the cutout. The cam washer may include a tab extending from the base, the tab seated within the cam.

According to one or more embodiments of the present disclosure, a slider assembly for adjusting a position of a seat along a seat post is provided. The slider assembly may include a slider configured to slide along the seat post and movable between a first configuration clamping the slider to the seat post and a second configuration allowing sliding movement of the slider along the seat post, the slider including an open end defined between a first arm and a second arm, and a cutout disposed in the first arm or the second arm. The slider assembly may include a cam coupled to the slider and movable to move the slider between the first configuration and the second configuration. The slider assembly may include a cam washer engaging the slider and the cam to limit a movement of the cam relative to the slider. The cam washer may include a base seated within the cutout disposed in the slider, the base having a non-circular shape for engagement with a complementary shape of the cutout. The cam washer may include a tab seated within the cam.

According to one or more embodiments of the present disclosure, an exercise device is provided. The exercise device may include a seat post and a seat assembly coupled to the seat post. The seat assembly may include a slider coupled to the seat post and configured to slide along the seat post, the slider including an open end defined between a first arm and a second arm, and a cutout disposed in the first arm or the second arm. The seat assembly may include a cam coupled to the slider and movable between a first position and a second position. The seat assembly may include a cam washer positioned between the cam and slider. The cam washer may include a base seated within the cutout disposed in the slider, the base having a non-circular shape for engagement with a complementary shape of the cutout. The cam washer may include a tab extending from the base, the tab seated within the cam.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the seat assembly described herein and should not be construed as a complete depiction of the scope of the seat assembly.

FIGS. 9a-9m and 10a-10e illustrate various views of the slider assembly, in accordance with one or more embodiments of the disclosure.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, adjustable seat assembly systems and methods are provided. A seat assembly may include a slider assembly having a slider and a cam connected to the slider. The slider may be configured to slide along a seat post and movable between a first configuration clamping the slider to the seat post and a second configuration releasing the slider from the seat post and allowing sliding movement of the slider along the seat post. The cam may be movable to move the slider between the first configuration and the second configuration. For instance, the cam may be movable between a first position and a second position, the first position compressing an open end of the slider to secure the slider to the seat post, and the second position allowing the open end to expand to release the slider from the seat post and allow positioning of the slider along the seat post. The slider assembly may include a cam washer positioned between the slider and the cam. The cam washer may be limited from rotating relative to the slider. The cam washer may include a tab engaging the cam to limit movement of the cam relative to the cam washer. The slider assembly may include a saddle shaft connected to the slider for connection with a seat.

Figure 1:
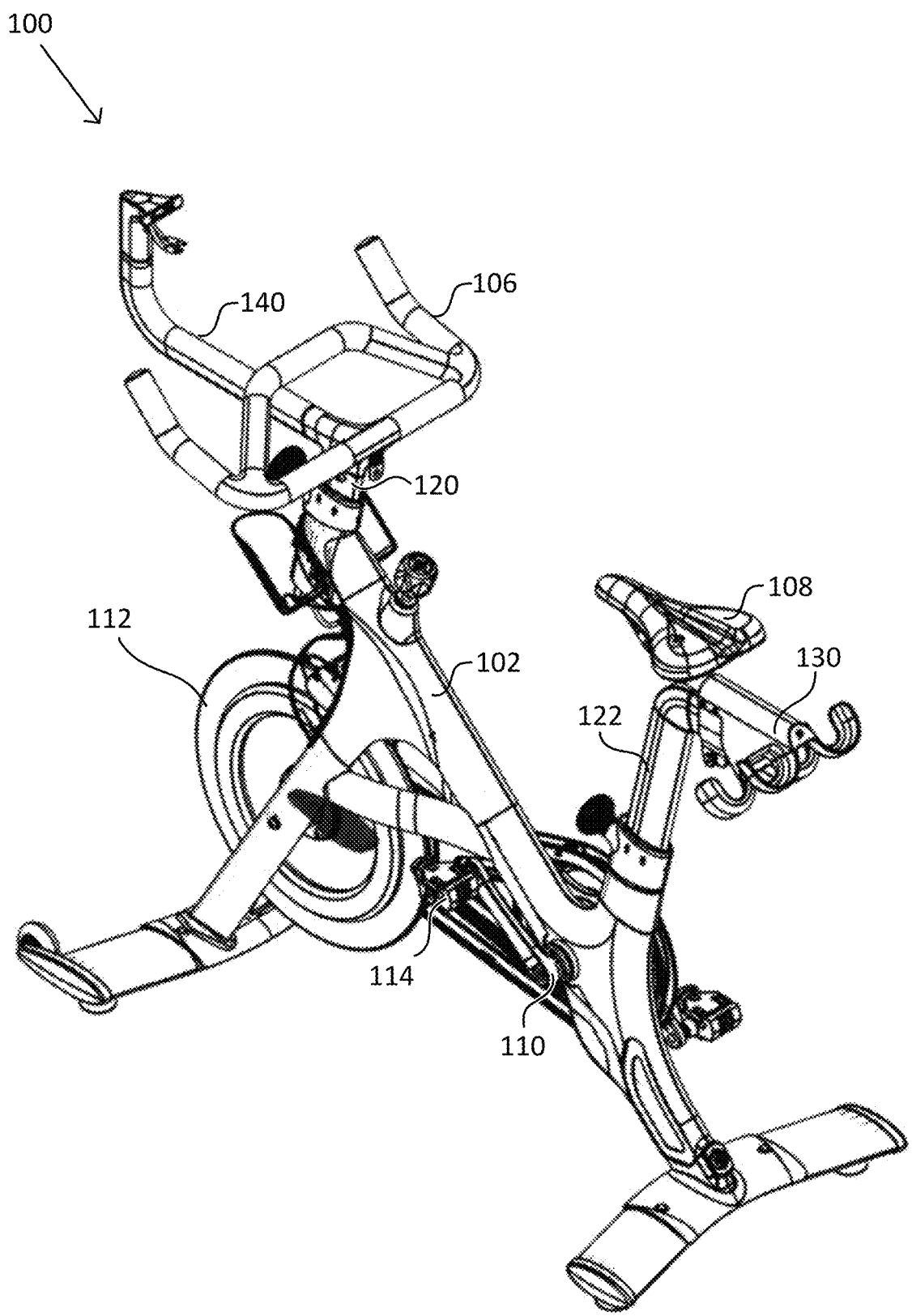
FIG. 1 illustrates a perspective view of an exercise device, in accordance with an embodiment of the disclosure.

FIG. 1 illustrates a perspective view of an exercise device 100 in accordance with an embodiment of the disclosure. The exercise device 100 may be any type of exercise apparatus designed for cardiovascular and/or strength training of a user. Referring to FIG. 1, the exercise device 100 is embodied as an exercise bike for illustration only. However, it is contemplated that the concepts described below may be applied to other exercise apparatuses, where suitable, such as a rowing machine or other devices with an adjustable seat. For example, the concepts described herein may be applied to any device with seat adjustment to adjust the device to a user, as described below.

As shown, the exercise device 100 may include a frame 102, a handlebar 106, a seat 108, and a drive mechanism 110 for operating against a resistance structure 112, or any combination thereof. The handlebar 106 may be supported by a handlebar post 120, and the seat 108 may be supported by a seat post 122. The drive mechanism 110 may include a pair of pedals 114 connected to a crank or similar device for operating the resistance structure 112, which may be a flywheel, an air resistance mechanism, or other suitable device designed for cardiovascular and/or strength of a user. As shown, the exercise device 100 may include one or more accessory holders configured to store or support exercise equipment, drinks, or other objects. For example, an accessory holder 130 may be connected to the exercise device 100 near the seat 108 to support one or more dumbbells, water bottles, or other objects.

In some embodiments, the exercise device 100 may include a display (not shown) configured to render information (e.g., commands, workout progress, entertainment, etc.) to the user. For example, the display may render one or more video streams, a range of performance metrics, images, or other visual representations. In some embodiments, the display may include or function as a user interface, such as the display including a range of controls. In some embodiments, the display may be used to access membership information, login or logout of an exercise management system, present live and/or archived exercise classes, and other content. The display may be a simple display device (e.g., an LCD screen, and LED screen, etc.), a portion of a computing device (e.g., a tablet, a laptop, etc.), or a portion of a distributed display system, among other examples. In embodiments, the display may be similar to the display disclosed in U.S. patent application Ser. No. 17/011,751 entitled "DISPLAY MOUNTING SYSTEMS AND METHODS," the disclosure of which is hereby incorporated herein by reference in its entirety.

To allow viewing of the display by the user, the display may be mounted in front of the user forward of the handlebar 106 (i.e., such that the handlebar 106 is positioned at least partially between the display and the seat 108). The display may be mounted to the exercise device 100 in many configurations. For instance, the exercise device 100 may include a support arm 140 extending from the handlebar 106. The display may be connected to the support arm 140 to place the display within a viewing area of the user during exercise. The display may be mounted to the support arm 140 via one or more devices or mechanisms configured to adjust the position or orientation of the display. For example, the display may be mounted to the support arm 140 in a manner allowing the display to tilt and/or pan relative to the handlebar 106 or the support arm 140, such as to orient the display towards the user during exercise. In embodiments, the display may be mounted similar to the mounting systems and methods disclosed in U.S. patent application Ser. No. 16/933,961 entitled "EXERCISE DEVICE ROTATING DISPLAY MECHANISM SYSTEMS AND METHODS," the disclosure of which is hereby incorporated herein by reference in its entirety In some embodiments, the exercise device 100 may include various features that allow adjustment of the position of the seat 108, the position of the handlebar 106, etc. For instance, the height of the handlebar 106 may be adjusted to fit the exercise bike to a user, such as by sliding the handlebar post 120 within the frame 102 towards or away from the frame 102. In like manner, the height of the seat 108 may be adjusted to fit the exercise bike to the user, such as by sliding the seat post 122 within the frame 102 towards and away from the frame 102. In some embodiments, the seat 108 may be adjusted towards or away from the handlebar 106 to further fit the exercise bike to the user. In embodiments, the seat 108, seat post 122, handlebar 106, or other component of the exercise device 100 may be connected to the exercise device 100 via an adjustable mount or mounting system, as described below.

Figure 2:
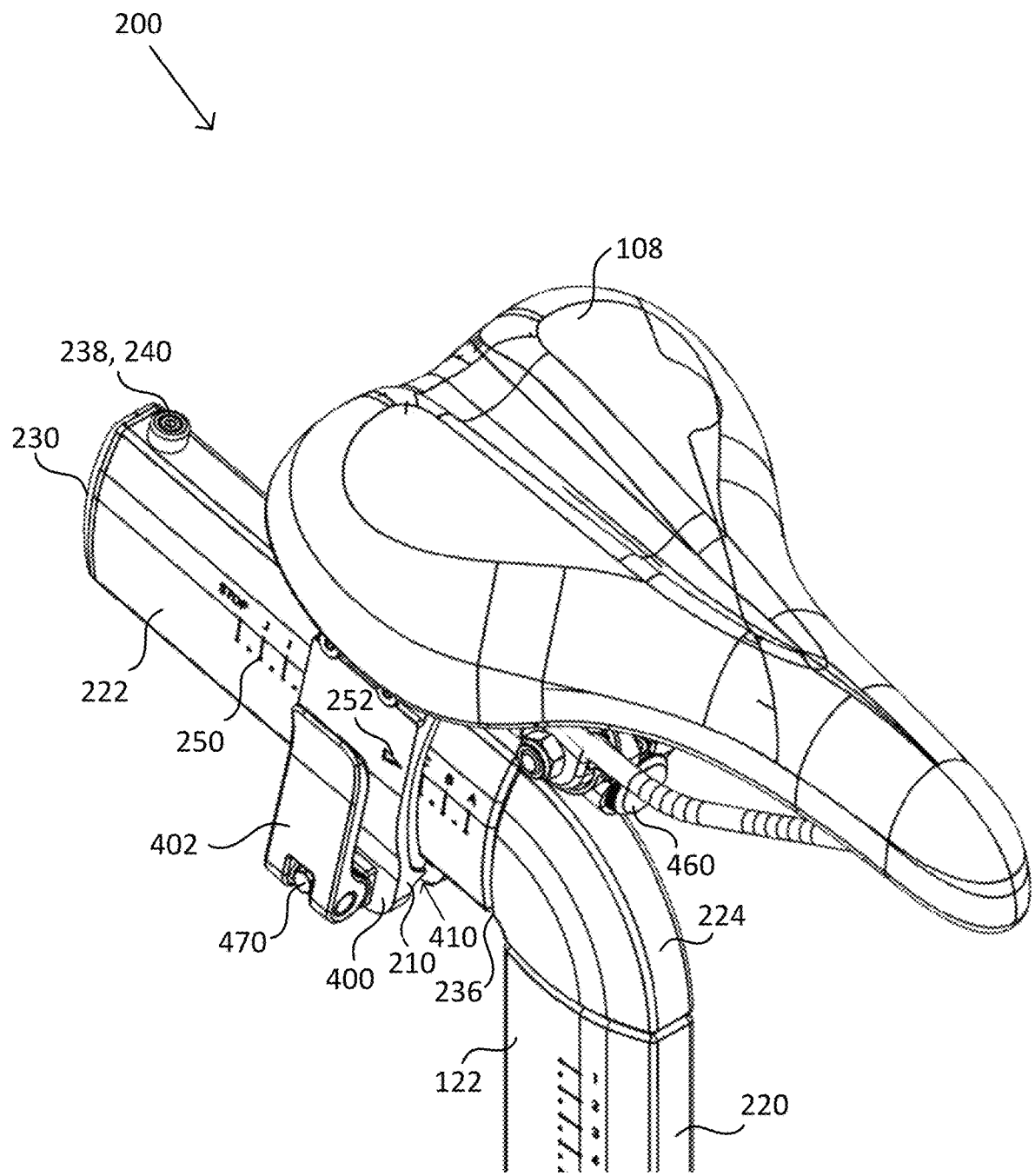
FIG. 2 illustrates a first perspective view of a seat assembly for the exercise device of FIG. 1, in accordance with an embodiment of the disclosure.
Figure 3:
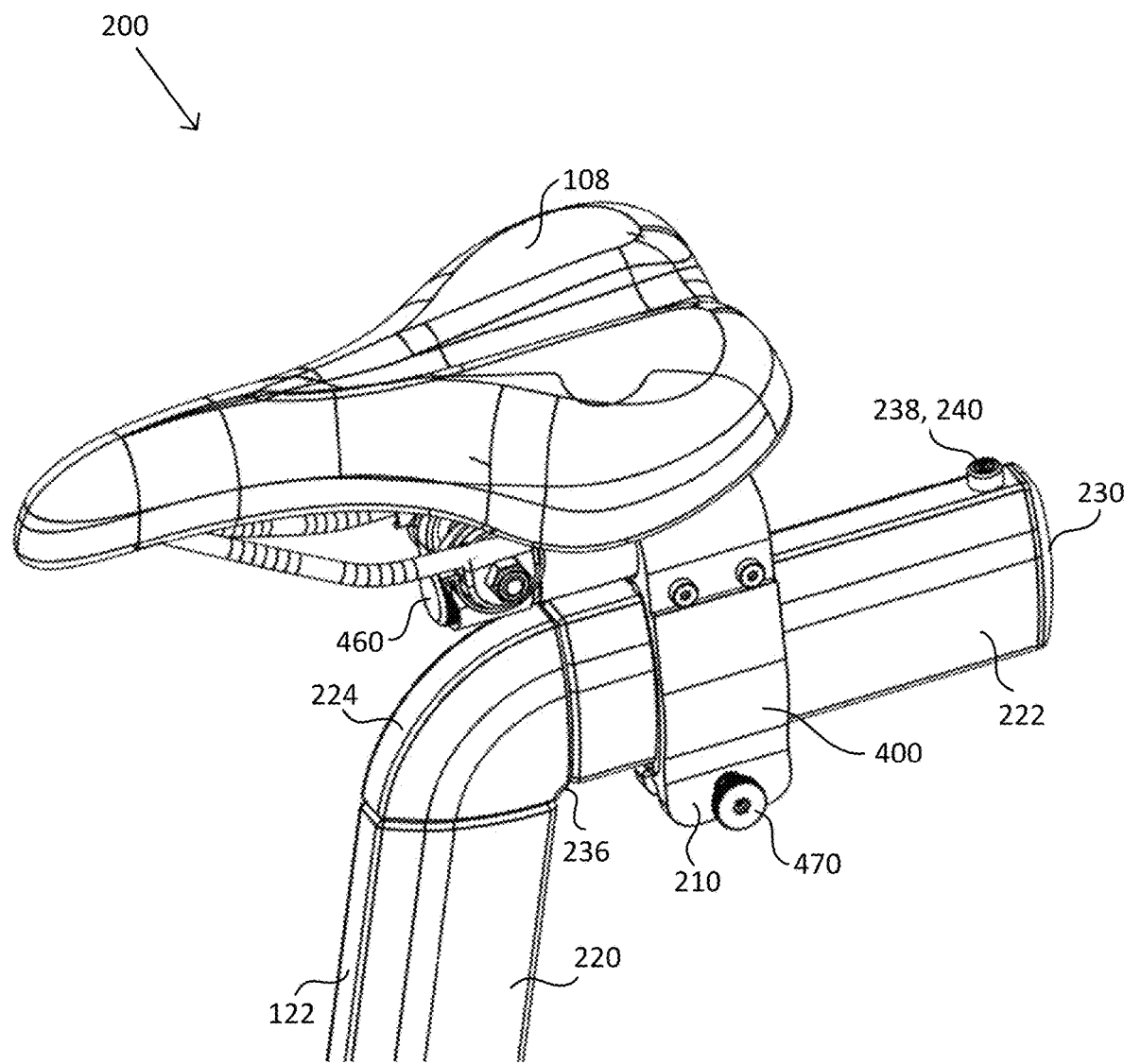
FIG. 3 illustrates a second perspective view of the seat assembly, in accordance with an embodiment of the disclosure.

FIG. 2 illustrates a first perspective view of a seat assembly 200 for the exercise device 100, in accordance with an embodiment of the disclosure. FIG. 3 illustrates a second perspective view of the seat assembly 200, in accordance with an embodiment of the disclosure. Referring to FIGS. 2-3, the seat assembly 200 may include seat 108, seat post 122, and a slider assembly 210 for adjustably connecting the seat 108 to the seat post 122. The slider assembly 210 may adjust a position of the seat 108 along the seat post 122. For example, the slider assembly 210 may allow the seat 108 to be positioned closer to or further away from the handlebar 106 to fit the exercise device 100 to the user. In embodiments, the slider assembly 210 may allow slidable movement along the seat post 122. For instance, the slider assembly 210 may slide along the seat post 122 towards the handlebar 106 to fit the exercise device 100 to a first user. Similarly, the slider assembly 210 may slide along the seat post 122 away from the handlebar 106 to fit the exercise device 100 to a second user. Although described with reference to slidably adjusting the seat 108 along the seat post 122, the slider assembly 210 may be configured to slidably connect other elements to the exercise device 100. For example, the slider assembly 210 may be adapted to slidably connect the seat post 122 to the frame 102, the handlebar 106 to the frame 102, or the like.

As shown, the seat post 122 may include a first section 220, a second section 222, and a curved section 224 between the first section 220 and the second section 222. The first section 220 may be an upright section and connect to the frame 102 of the exercise device 100. For example, the first section 220 may slide within the frame 102 to adjust a vertical position of the seat 108. The second section 222 may be a horizontal section and extend from the curved section 224 to a terminal end 230, with may be defined by or include an end cap. The slider assembly 210 may slide along the second section 222 between the curved section 224 and the terminal end 230. For instance, the slider assembly 210 may be positioned anywhere between the curved section 224 and the terminal end 230 as desired, such as to adjust the seat 108 and exercise device 100 to a user.

In embodiments, the seat post 122 may include one or more stops defining an extent of slidable movement of the slider assembly 210 along the second section 222. For instance, the curved section 224 may define a first stop 236 that limits sliding movement of the slider assembly 210 along the seat post 122 towards the handlebar 106. As shown, a second stop 238 may be defined at or near the terminal end 230 of the second section 222 to limit sliding movement of the slider assembly 210 along the seat post 122 away from the handlebar 106, such as to limit the slider assembly 210 from sliding off the back of the seat post 122. Depending on the application, the second stop 238 may be defined by a feature of the terminal end 230 or by a component connected to the terminal end 230. For example, a fastener 240 (e.g., a bolt or screw) may be attached to the terminal end 230 of the seat post 122 to define the second stop 238. The slider assembly 210 may be free to slide along the seat post 122 between the first stop 236 and the second stop 238. For instance, the slider assembly 210 may slide forwardly along the seat post 122 until the slider assembly 210 engages the first stop 236. Similarly, the slider assembly 210 may slide rearwardly along the seat post 122 until the slider assembly 210 engages the second stop 238.

In some embodiments, the seat assembly 200 may include features configured to provide feedback to a user regarding the position of the slider assembly 210 along the seat post 122. For example, the seat post 122 may include one or more markings 250 designating one or more positions along the seat post 122 (e.g., at designated length intervals along the seat post 122). The slider assembly 210 may be aligned with a desired marking to adjust the seat 108 as desired, such as aligning an edge of the slider assembly 210 with the desired marking. In some embodiments, the slider assembly 210 may include an indicator 252 for referencing the slider assembly 210 against the markings 250 of the seat post 122.

Figure 4:
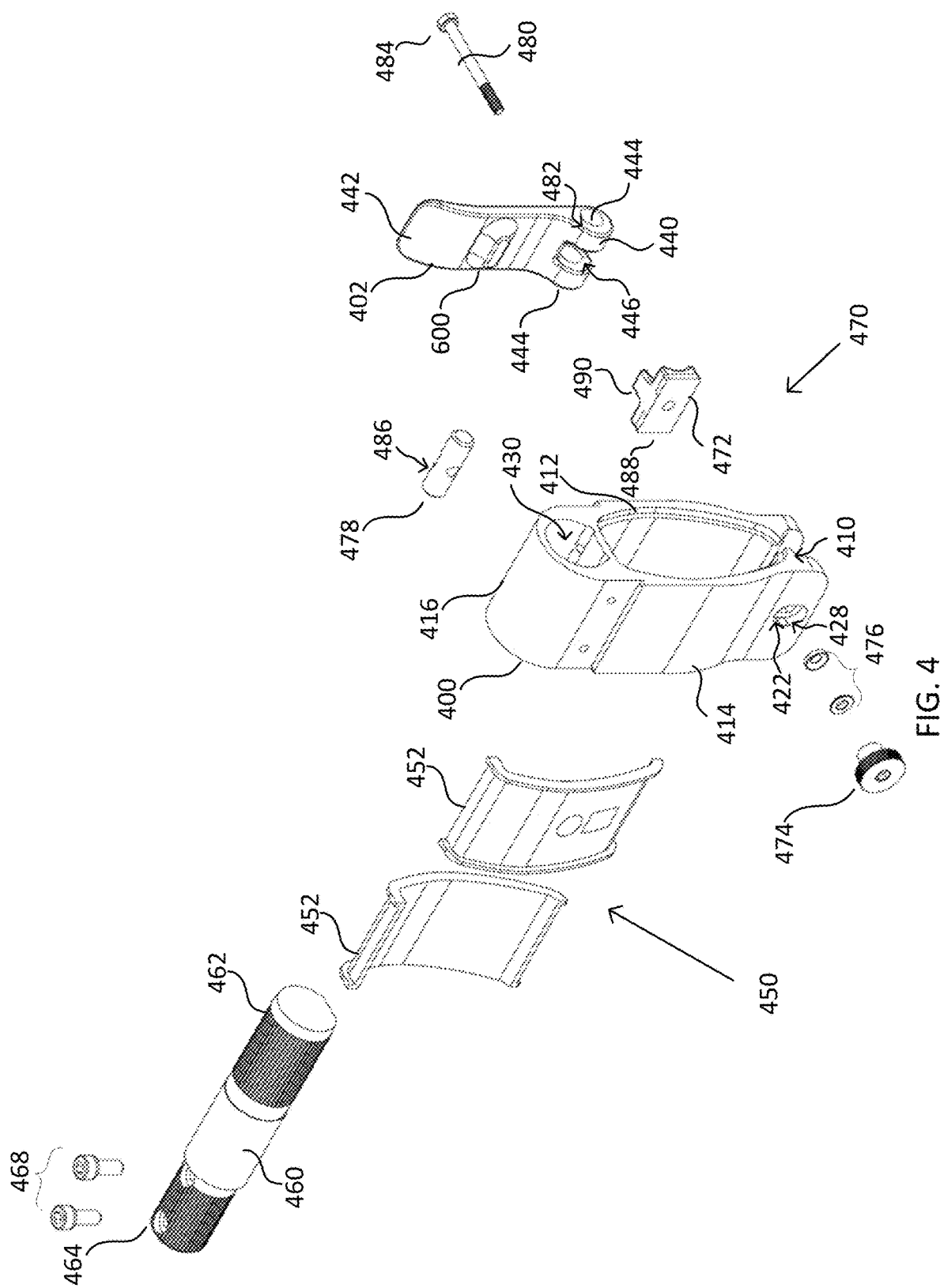
FIG. 4 illustrates a first exploded view of a slider assembly, in accordance with an embodiment of the disclosure.
Figure 5:
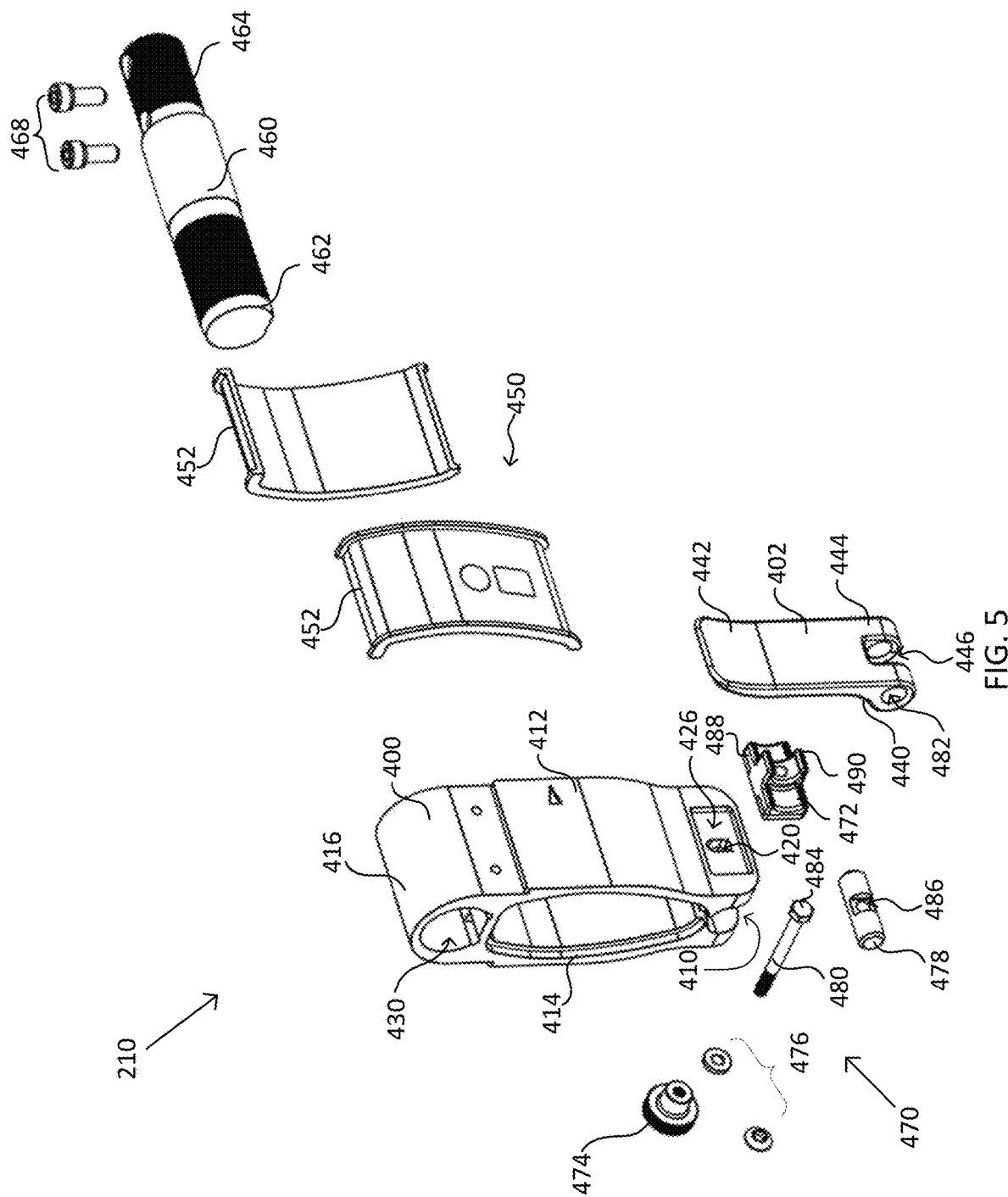
FIG. 5 illustrates a second exploded view of the slider assembly, in accordance with an embodiment of the disclosure.

FIG. 4 illustrates a first exploded view of the slider assembly 210, in accordance with an embodiment of the disclosure. FIG. 5 illustrates a second exploded view of the slider assembly 210, in accordance with an embodiment of the disclosure. Referring to FIGS. 2-5, the slider assembly 210 may include many configurations configured to adjust a position of the seat 108 along the seat post 122. In embodiments, the slider assembly 210 may include a slider 400 and a cam 402. The slider 400 may be connectable to the seat post 122 and may include many configurations allowing the slider 400 to slide along the seat post 122. As one example, the slider 400 may include an open end 410 allowing the slider 400 to contract and expand to releasably clamp against the seat post 122. The open end 410 may be defined by a first arm 412 and a second arm 414. In some embodiments, the first arm 412 and the second arm 414 may extend from a central portion 416. In embodiments, the slider 400 may include a clamshell-type design wrapping around the seat post 122. The first arm 412 may include a first aperture 420 disposed therein, and the second arm 414 may include a second aperture 422 disposed therein. The first aperture 420 and the second aperture 422 may be aligned to receive a fastener therethrough. A first cutout 426 may be disposed in the first arm 412 around the first aperture 420. Similarly, a second cutout 428 may be disposed in the second arm 414 around the second aperture 422. The central portion 416 of the slider 400 may include a bore 430 to receive one or more components of the slider assembly 210, as explained below.

The cam 402 may be connected to the slider 400 and movable between a first position (see FIG. 6) and a second position (see FIG. 7) to releasably clamp the slider 400 against the seat post 122. For example, moving the cam 402 to the first position may clamp the slider 400 against the seat post 122. Moving the cam 402 to the second position may release the slider 400 from the seat post 122 and allow sliding movement of the slider 400 along the seat post 122. The cam 402 may include an eccentric portion 440 and a handle 442 extending from the eccentric portion 440. User actuation of the cam 402 via the handle 442 may eccentrically load the cam 402 against the slider 400 to either clamp the slider 400 to or release the slider 400 from the seat post 122. For instance, moving the clamp to the first position via the handle 442 may press the eccentric portion 440 of the cam 402 against the slider 400 to clamp the slider 400 against the seat post 122. Moving the clamp to the second position via the handle 442 may release the eccentric portion 440 from the slider 400 to release the slider 400 from the seat post 122. The eccentric portion 440 may be defined by a pair of tabs 444 extending from the handle 442, the tabs 444 defining a space 446 between the tabs 444.

With continued reference to FIGS. 2-5, the slider assembly 210 may include an insert 450 positioned within the slider 400. The insert 450 may facilitate sliding movement of the slider 400 along the seat post 122. For example, the insert 450 may be formed from a material, such as a thermoplastic material, for example, that reduces the coefficient of friction between the slider assembly 210 and the seat post 122. In embodiments, the insert 450 may conformly engage the slider 400 to the seat post 122 when the slider 400 is clamped to the seat post 122 (e.g., when the cam 402 is positioned in the first position). For example, the insert 450 may define a compliant interface between the slider 400 and the seat post 122, such as to ensure sufficient clamping of the slider 400 to the seat post 122, for instance. Depending on the application, the insert 450 may include a plurality of insert members 452, such as a pair of insert members 452 as shown.

The slider assembly 210 may include a saddle shaft 460 connected to or extending from the slider 400 for connection with the seat 108. For example, the saddle shaft 460 may be connected to the central portion 416 of the slider 400. In embodiments, the saddle shaft 460 may be cantilevered from the slider 400 for connection to the seat 108. As shown in FIGS. 2-3, the saddle shaft 460 may extend forwardly away from the terminal end 230 of the seat post 122, such as along or parallel to a longitudinal axis of the exercise device 100. In embodiments, the accessory holder 130 may be connected to the slider 400, with the accessory holder 130 extending from the slider 400 opposite the saddle shaft 460. The saddle shaft 460 may extend parallel to at least a portion of the seat post 122, such as parallel to the second section 222 of the seat post 122. The seat 108 may be connected to the saddle shaft 460, such as to an end of the saddle shaft 460.

As best illustrated in FIGS. 4-5, the saddle shaft 460 may include a first end 462 and a second end 464. The first end 462 may be connected to the slider 400, and the second end 464 may be connected to the seat 108. The first end 462 may be engaged with the slider 400 to limit rotation of the saddle shaft 460 relative to the slider 400. For example, the first end 462 may include a non-circular shape for complementary engagement within the bore 430 of the slider 400. In some embodiments, the first end 462 may be splined for splined engagement with the bore 430 of the slider 400.

The second end 464 may include one or more features to limit movement of the seat 108 relative to the saddle shaft 460. For instance, the second end 464 may include one or more fasteners 468 configured to limit removal of the seat 108 from the saddle shaft 460. The fasteners 468 may engage a portion of the seat 108 to limit removal of the seat 108. In embodiments, the fasteners 468 may align the seat 108, such as to limit or prevent canting of the seat 108. As shown, the second end 464 may be splined for splined engagement with the seat 108.

Referring to FIGS. 4-5, the slider assembly 210 may include a cam mount 470 securing the cam 402 to the slider 400. As described herein, the cam mount 470 may be configured to adjust a tension provided by the cam 402 to compress the open end 410 of the slider 400. For example, the cam mount 470 may be adjusted to adjust the clamping force provided by the cam 402 against the slider 400. In addition, the cam mount 470 may be configured to constrain movement of the cam 402 to a plane. For instance, the cam mount 470 may allow the cam 402 to move between only its first position and its second position. Each feature will be described in detail below.

The cam mount 470 may include a cam washer 472, a thumb nut 474, a spherical washer set 476, a cam pin 478, and a bolt 480 extending through the cam pin 478, the slider 400, and the spherical washer set 476 for threaded engagement with the thumb nut 474. The cam washer 472 may be positioned between the cam 402 and the first arm 412 of the slider 400, such as at least partially within the first cutout 426 of the first arm 412. The thumb nut 474 may adjust the adjust the tension provided by the cam 402. For example, tightening the thumb nut 474 on the bolt 480 may increase the tension or clamping force provided by the cam 402. In like manner, loosening the thumb nut 474 on the bolt 480 may decrease the tension or clamping force provided by the cam 402. The spherical washer set 476 may include a male washer and a female washer that, when nested, swivel to compensate for tolerance variations and uneven surfaces. The spherical washer set 476 may be positioned between the thumb nut 474 and the second arm 414 of the slider 400, such as at least partially within the second cutout 428 of the second arm 414.

The cam pin 478 may be connected to the cam 402, such that the cam 402 rotates about the cam pin 478. For example, the cam pin 478 may rotatably seat within holes 482 disposed in the tabs 444 of the eccentric portion 440 of the cam 402. In embodiments, the cam pin 478 may be shaped to engage the bolt 480. For instance, the bolt 480 may include a hex head 484 engaged within a recess 486 of the cam pin 478 to limit rotation of the bolt 480. As a result, the bolt 480 may be fixed or nearly fixed rotationally such that rotation of the thumb nut 474 to adjust the tension provided by the cam mount 470 does not rotate the bolt 480.

The cam washer 472 may be limited from rotating relative to the slider 400. For example, the cam washer 472 may include a base 488 seated at least partially within the first cutout 426 disposed in the first arm 412 of the slider 400 to limit movement (e.g., rotational movement) relative to the slider 400. In embodiments, the base 488 may include a non-circular shape for engagement with a complementary shape of the first cutout 426 to limit rotational movement of the base 488 relative to the slider 400.

The cam washer 472 may include a tab 490 extending from the base 488. The tab 490 may be shaped for complementary engagement with the cam 402. As shown, the tab 490 may seat at least partially within a portion of the cam 402 to limit movement of the cam 402 relative to the cam washer 472. For instance, the tab 490 may seat or extend at least partially within the space 446 between the tabs 444 of the eccentric portion 440 of the cam 402. In some embodiments, the tab 490 may be shaped for complementary engagement with the cam pin 478 of the cam mount 470. For example, the tab 490 may include an arcuate shape to receive or at least partially extend around the cam pin 478.

The tab 490 and/or base 488 may engage the eccentric portion 440 of the cam 402 to limit movement of the cam 402. For instance, the tab 490 and/or base 488 may define a bearing surface for the cam 402. In such embodiments, the eccentric portion 440 of the cam 402 may engage at least portions of the base 488 and the tab 490 of the cam washer 472. Positioning the tab 490 of the cam washer 472 within the cam 402 may limit rotation of the cam 402 about an axis defined by the bolt 480. As a result, the tab 490 may constrain movement of the cam 402 within a plane, such a vertical plane. In embodiments, the saddle shaft 460 may extend from the slider 400 along an axis perpendicular or substantially perpendicular to the plane. In embodiments, the plane may be perpendicular or substantially perpendicular to an axis of the seat post 122, such as a longitudinal axis of the exercise device 100.

Figure 6:
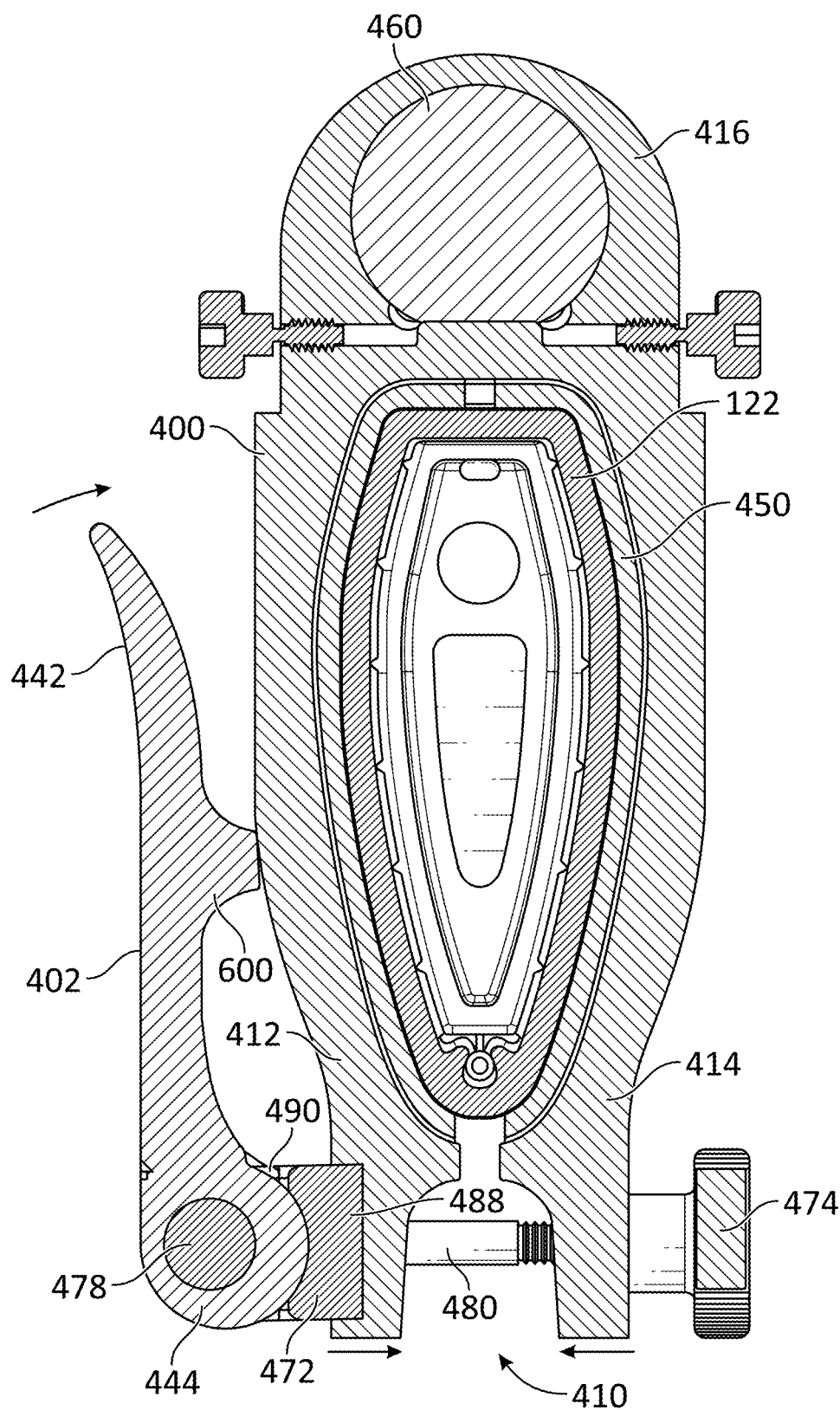
FIG. 6 illustrates a cross-sectional view of the slider assembly connected to a seat post and in a first configuration, in accordance with an embodiment of the disclosure.
Figure 7:
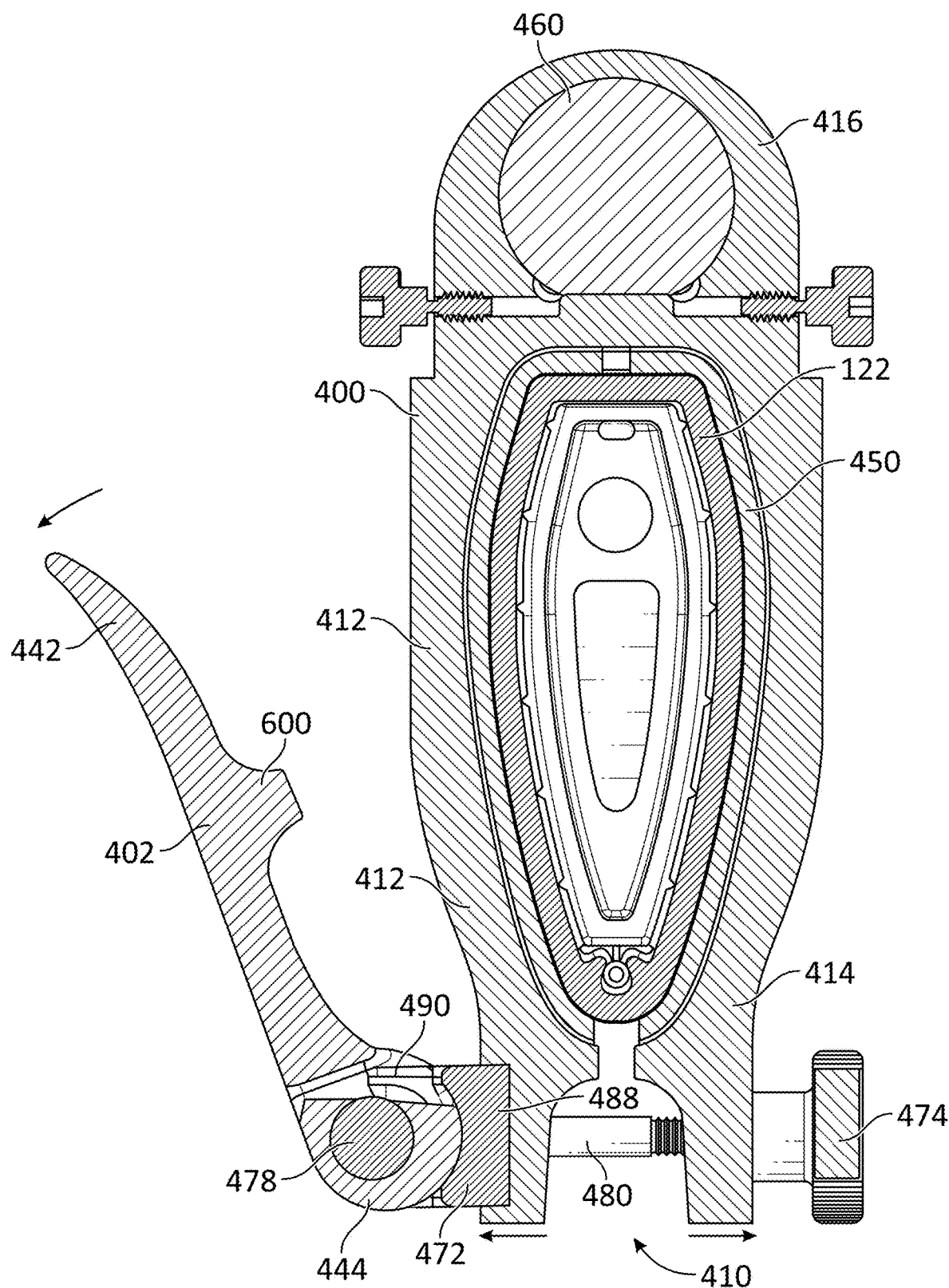
FIG. 7 illustrates a cross-sectional view of the slider assembly connected to the seat post and in a second configuration, in accordance with an embodiment of the disclosure.

FIG. 6 illustrates a cross-sectional view of the slider assembly 210 connected to the seat post 122 an in a first configuration, in accordance with an embodiment of the disclosure. FIG. 7 illustrates a cross-sectional view of the slider assembly 210 connected to the seat post 122 and in a second configuration, in accordance with an embodiment of the disclosure. Referring to FIGS. 6-7, the slider 400 may be movable between a first configuration (see FIG. 6) and a second configuration (see FIG. 7). The first configuration may clamp the slider 400 to the seat post 122. The second configuration may release the slider 400 from the seat post 122 and allow sliding movement of the slider 400 along the seat post 122. In the first configuration, the open end 410 of the slider 400 may be compressed, such as by moving the first arm 412 and the second arm 414 towards each other, to reduce the space between the seat post 122 and the slider assembly 210 (e.g., between the seat post 122 and the insert 450/slider 400). In the second configuration, the open end 410 of the slider 400 may be expanded, such as automatically or manually, by moving the first arm 412 and the second arm 414 away from each other to increase the space between the seat post 122 and the slider assembly 210 (e.g., between the seat post 122 and the insert 450/slider 400).

The cam 402 may be movable to move the slider 400 between the first configuration and the second configuration. For instance, the cam 402 may be moved to its first position to compress the open end 410 of the slider 400 to secure the slider 400 to the seat post 122. Conversely, the cam 402 may be moved to its second position to allow the open end 410 to expand to release the slider 400 from the seat post 122 and allow positioning of the slider 400 along the seat post 122. As shown, the cam 402 may include a boss 600 extending from the handle 442. The boss 600 may engage the slider 400, such as the first arm 412 of the slider 400, for example, to define the first position of the cam 402. For example, the cam 402 may be moved toward the first position until the boss 600 engages the side of the slider 400, limiting further movement of the cam 402 towards the slider 400. As a result, the boss 600 may limit or prevent pinching between the cam 402 and the slider 400 (e.g., between the handle 442 and the first arm 412).

Figure 8:
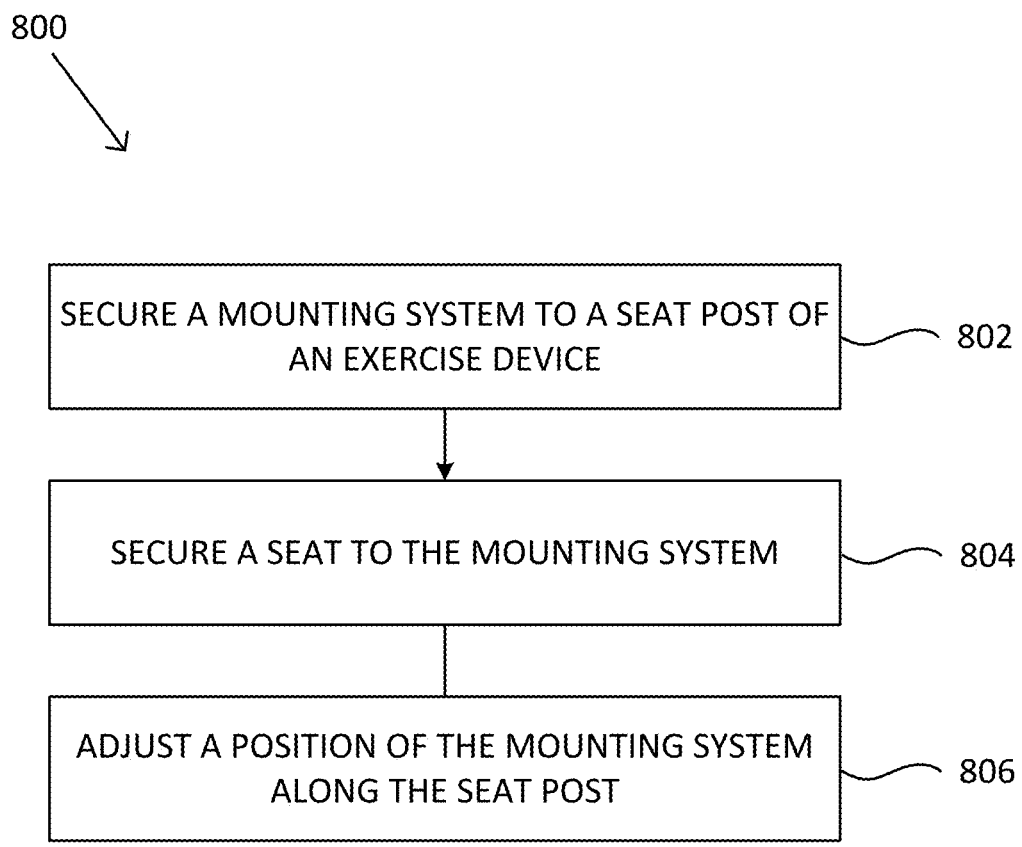
FIG. 8 illustrates a flow diagram of a process of mounting and using a slider assembly, in accordance with an embodiment of the disclosure.
Figure 9A:
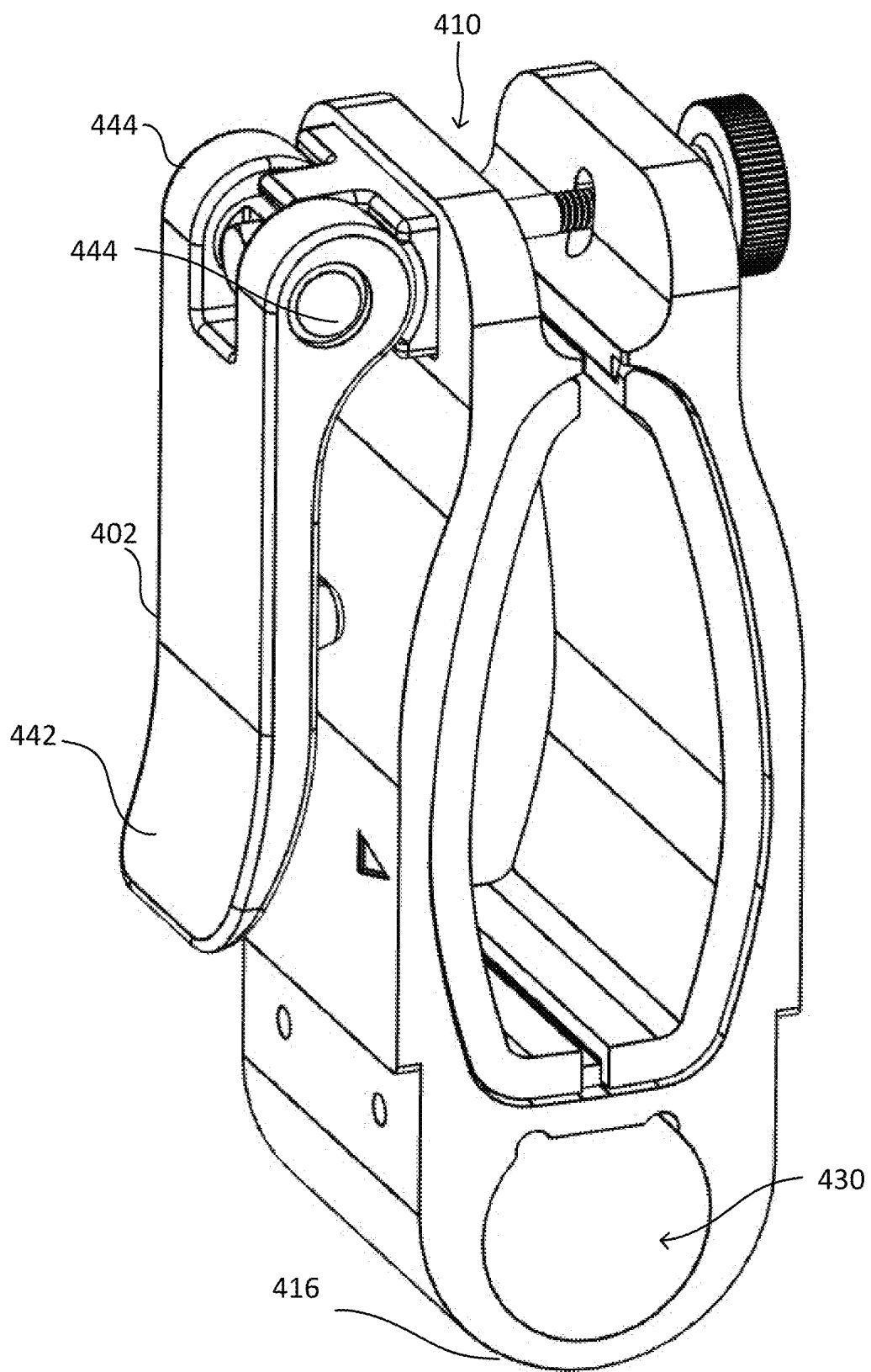
Figure 9B:
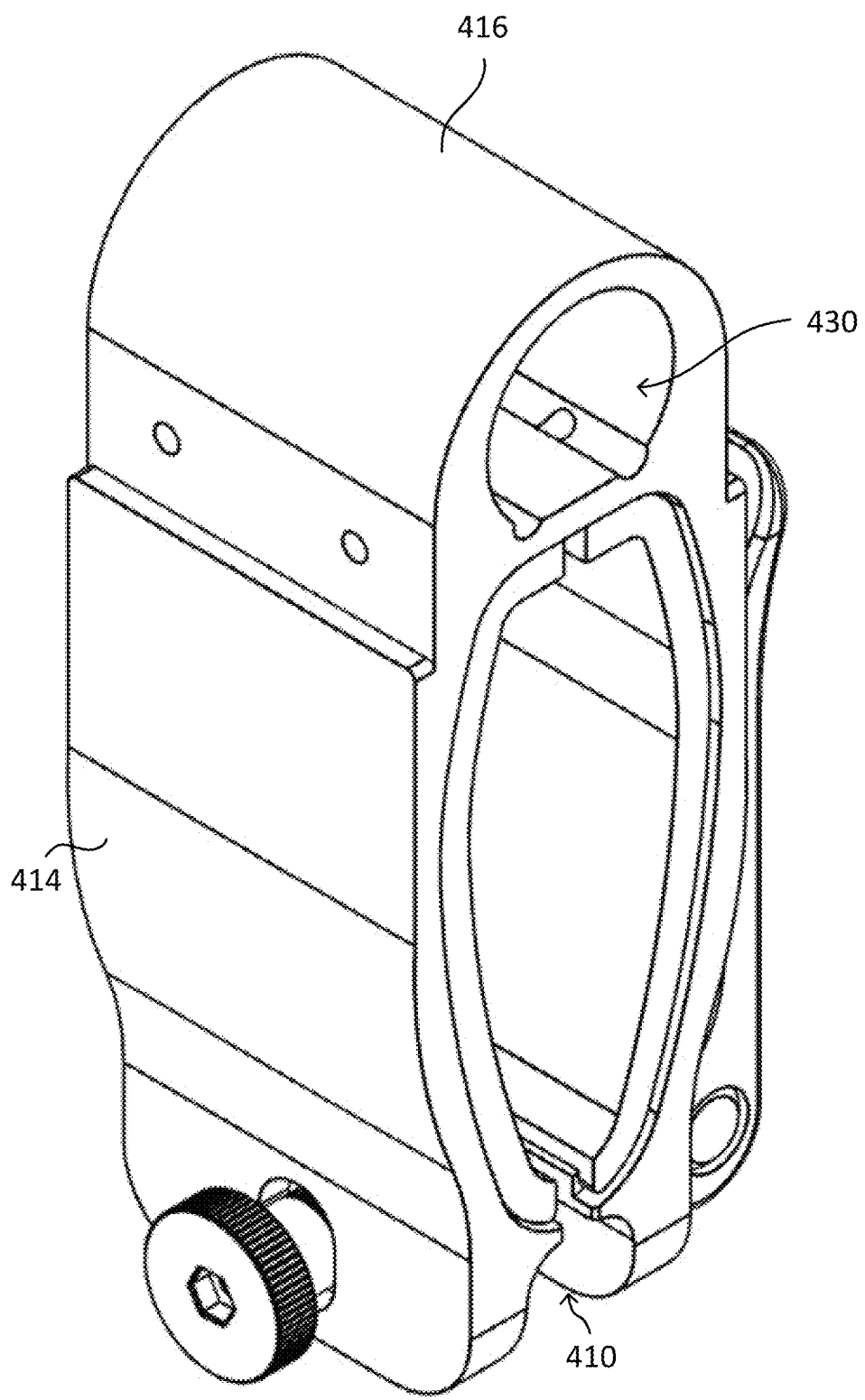
Figure 9C:
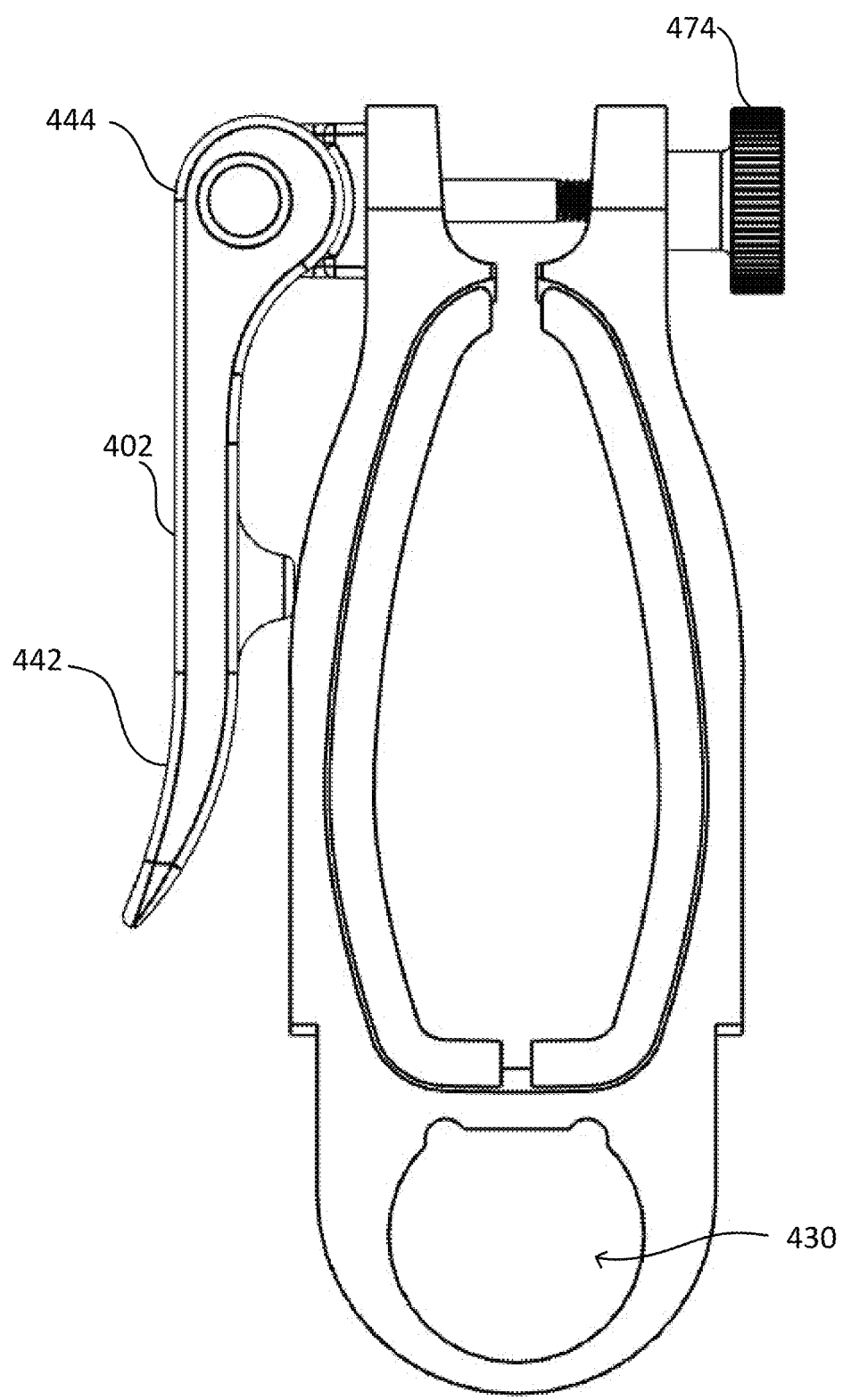
Figure 9D:
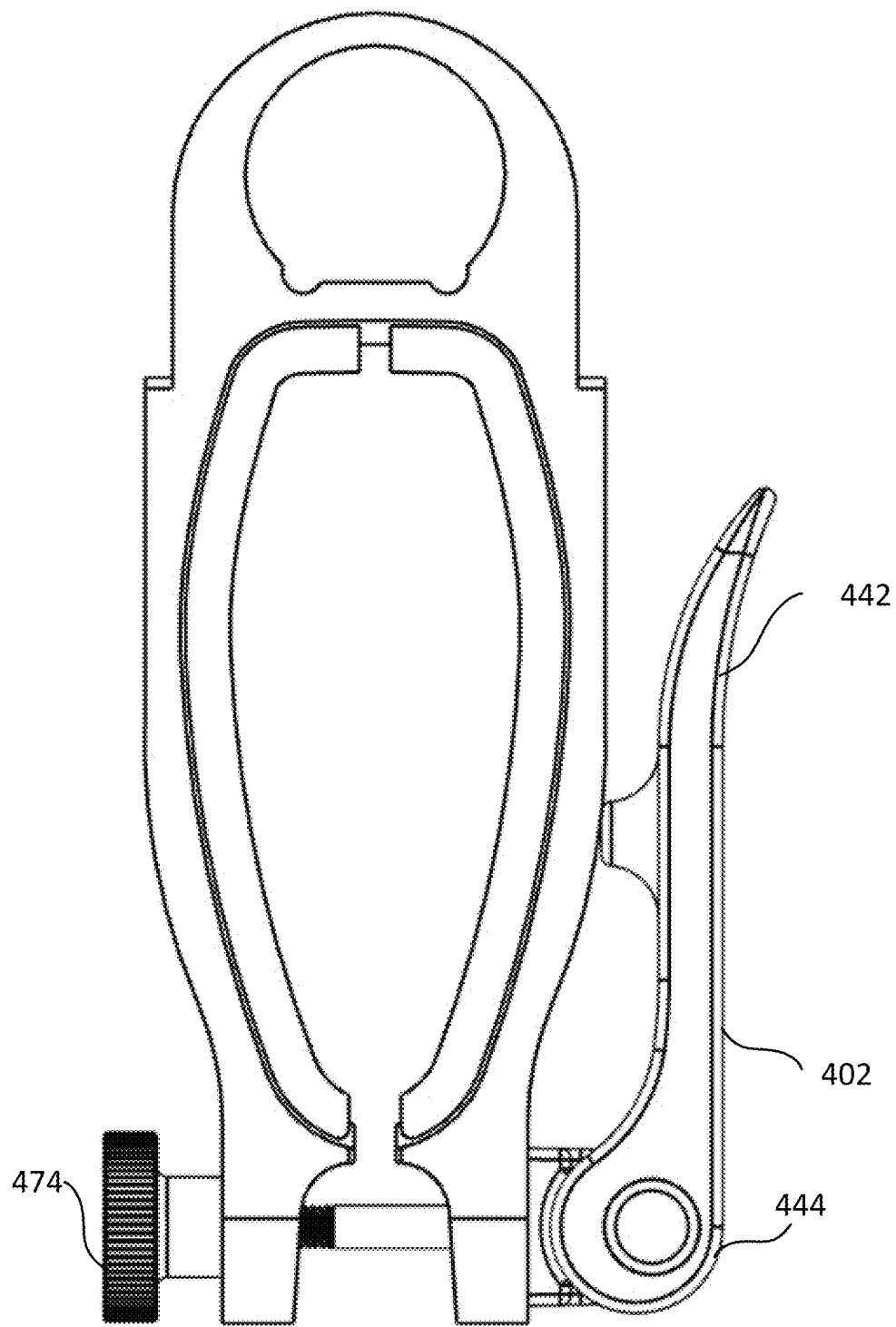
Figure 9E:
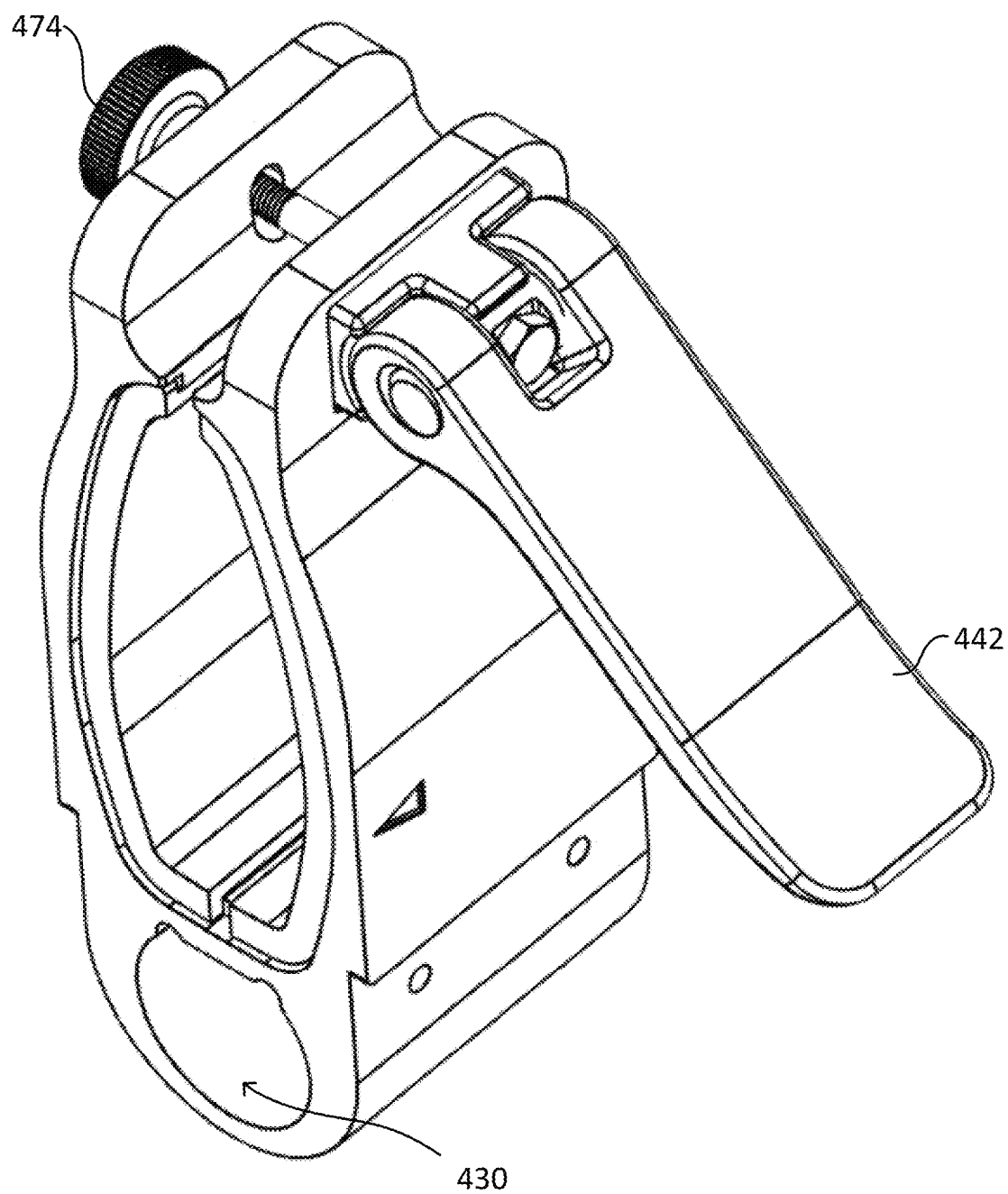
Figure 9F:
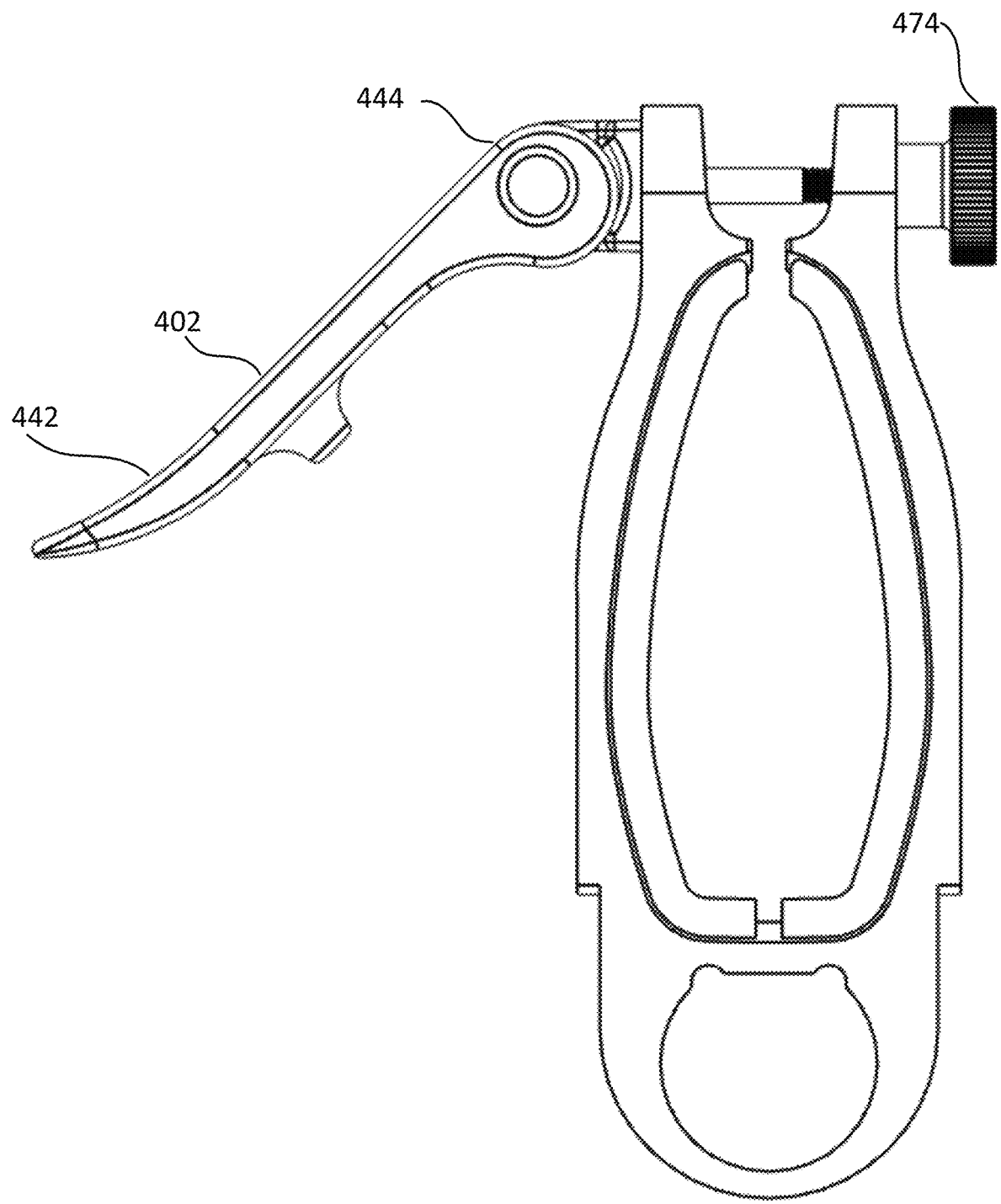
Figure 9G:
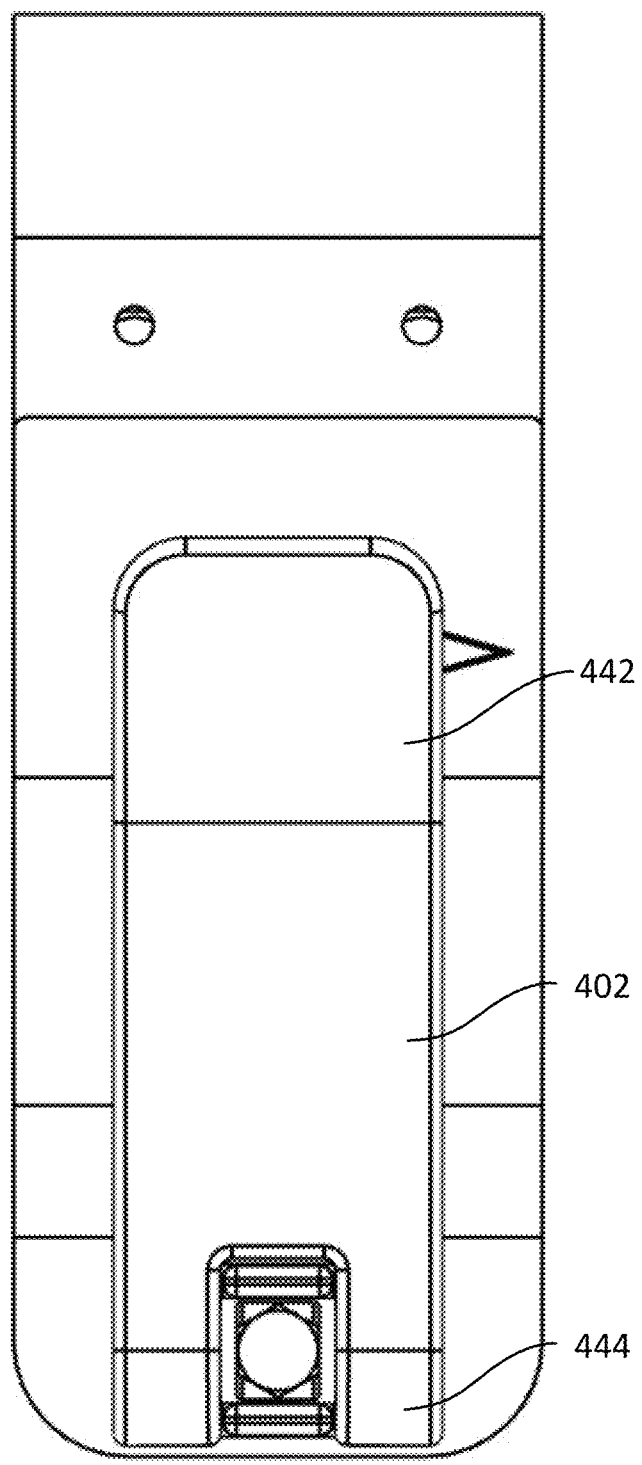
Figure 9H:
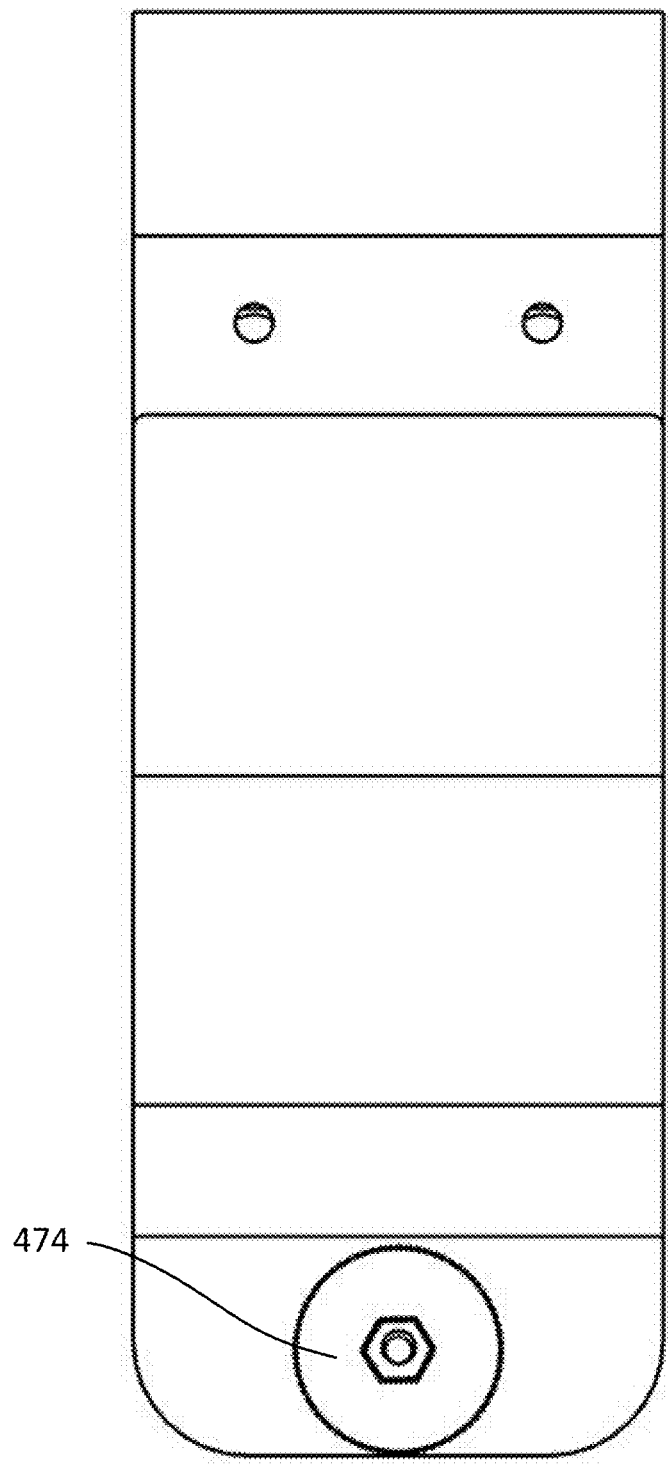
Figure 9I:
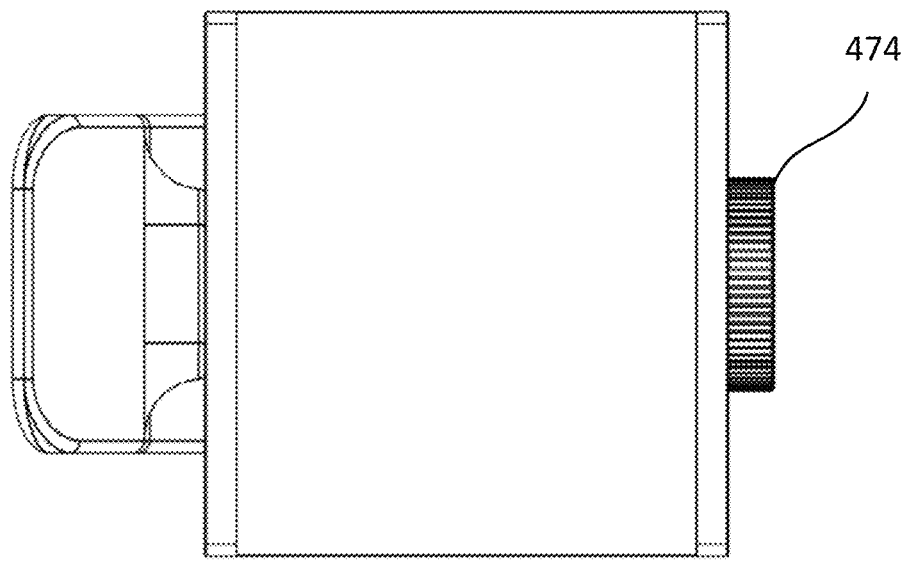
Figure 9J:
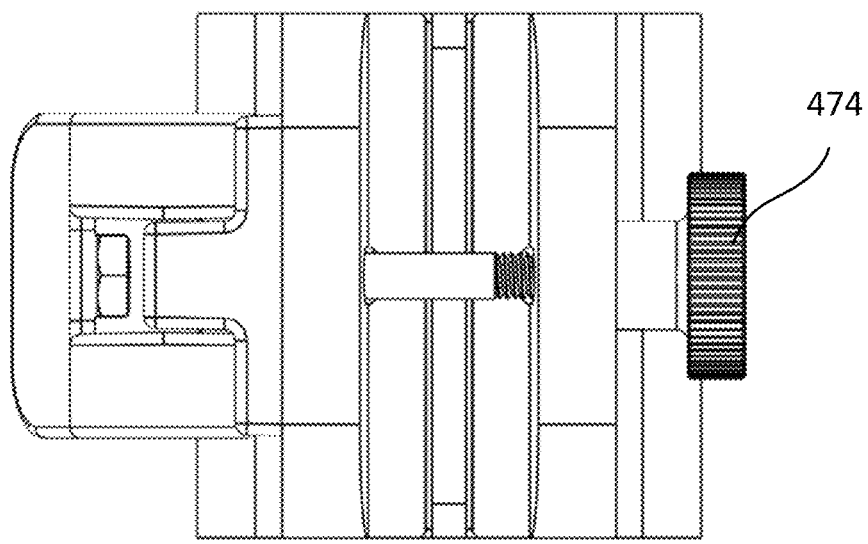
Figure 9K:
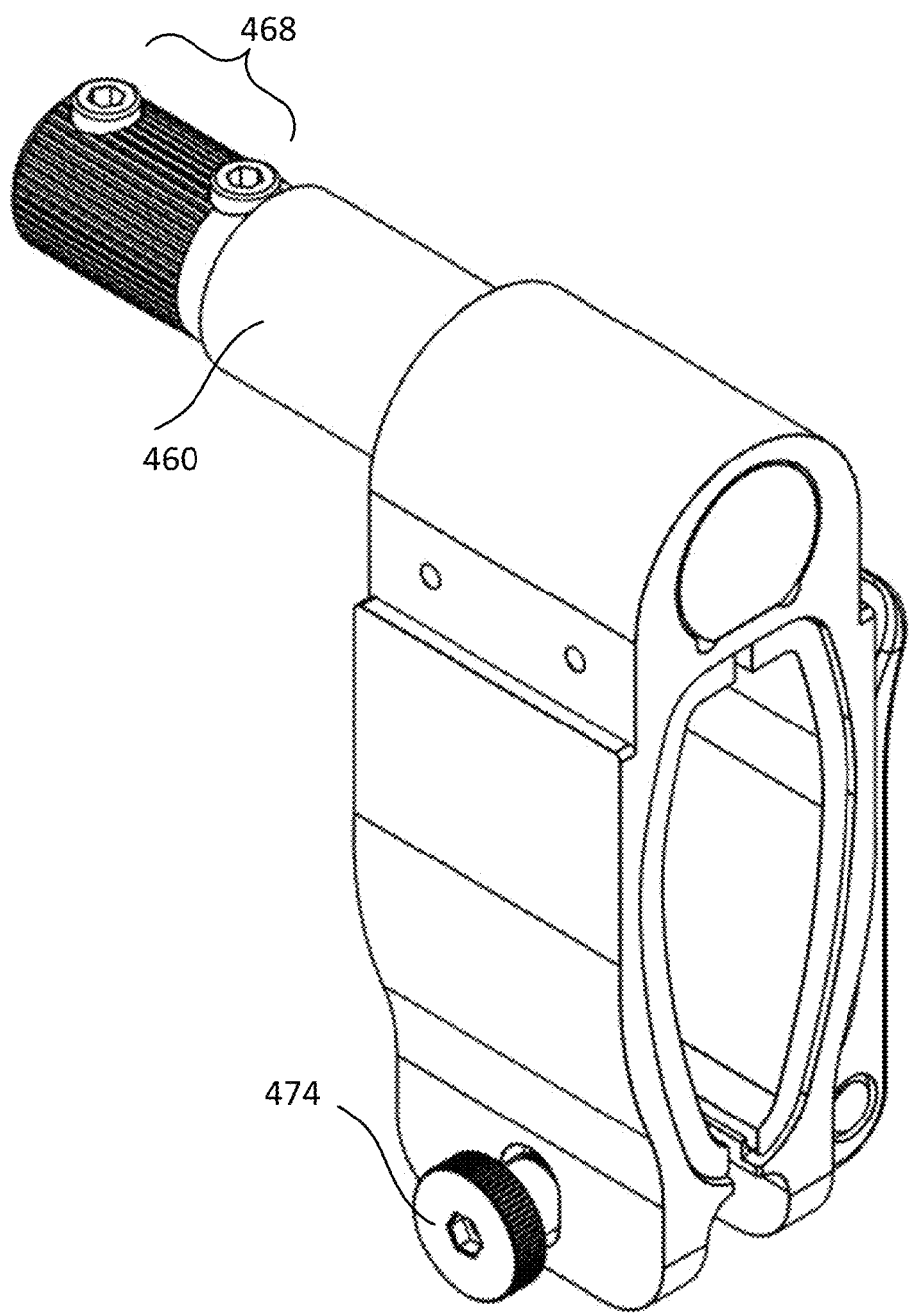
Figure 9I:
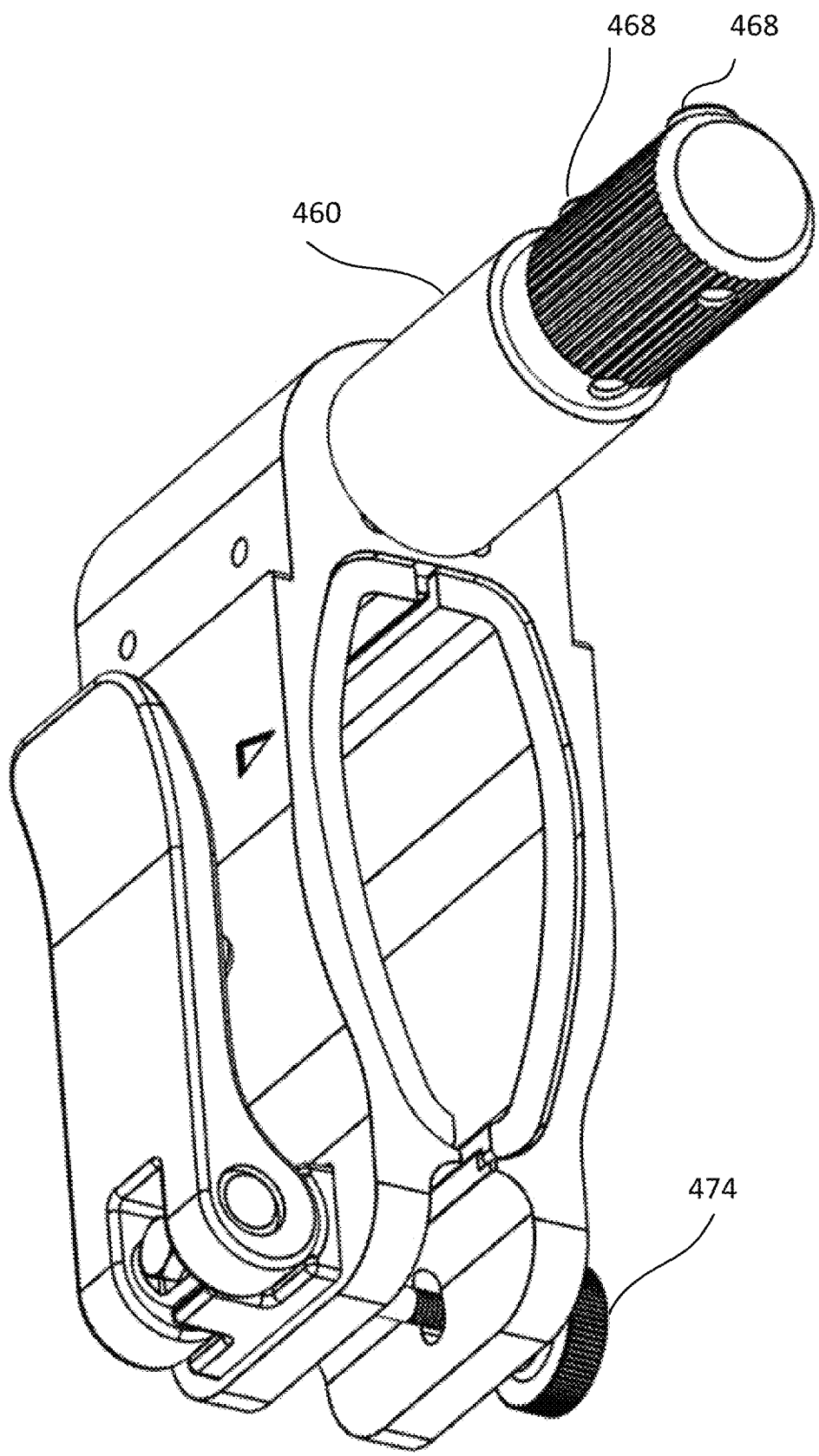
Figure 9M:
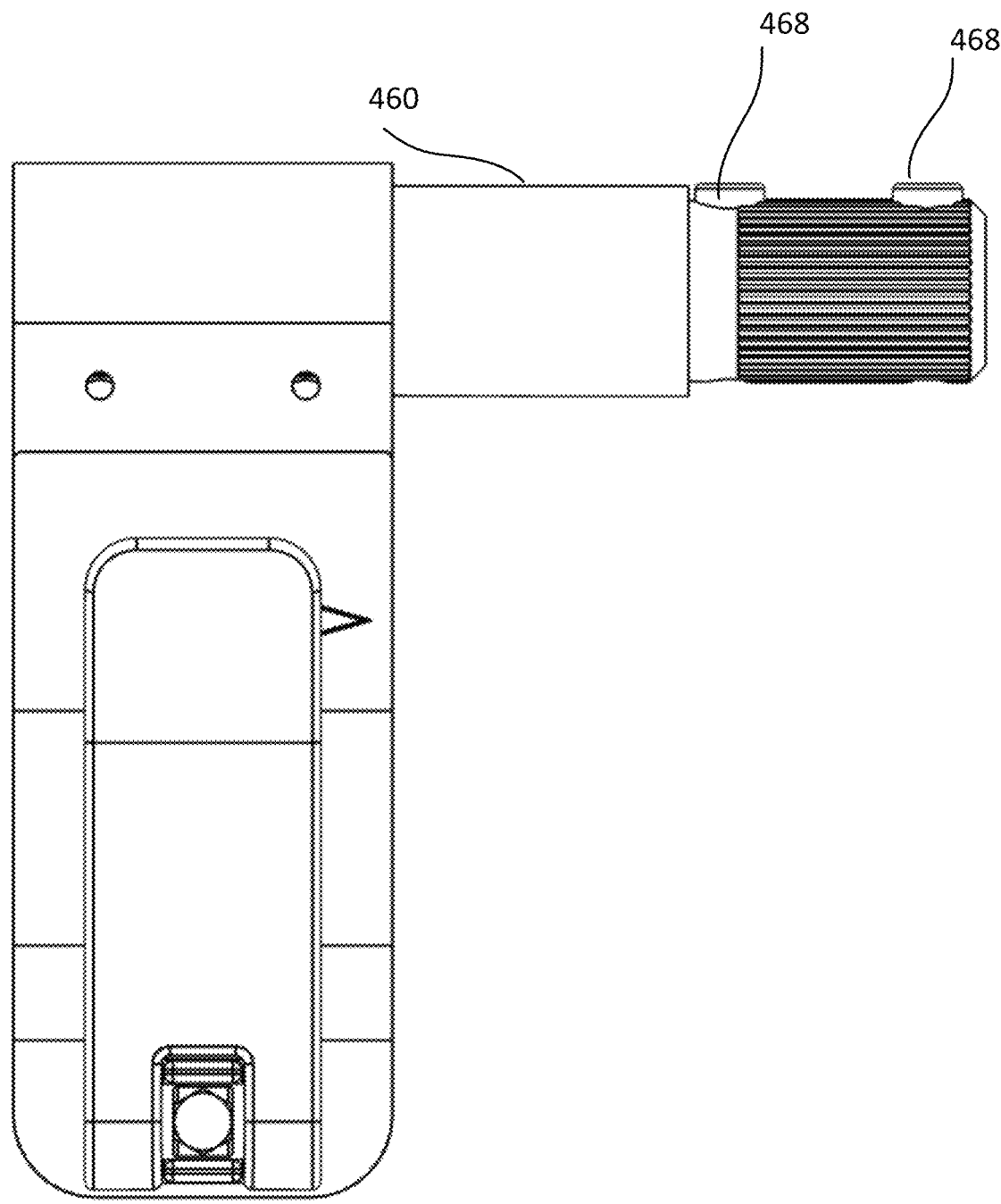
Figure 10A:
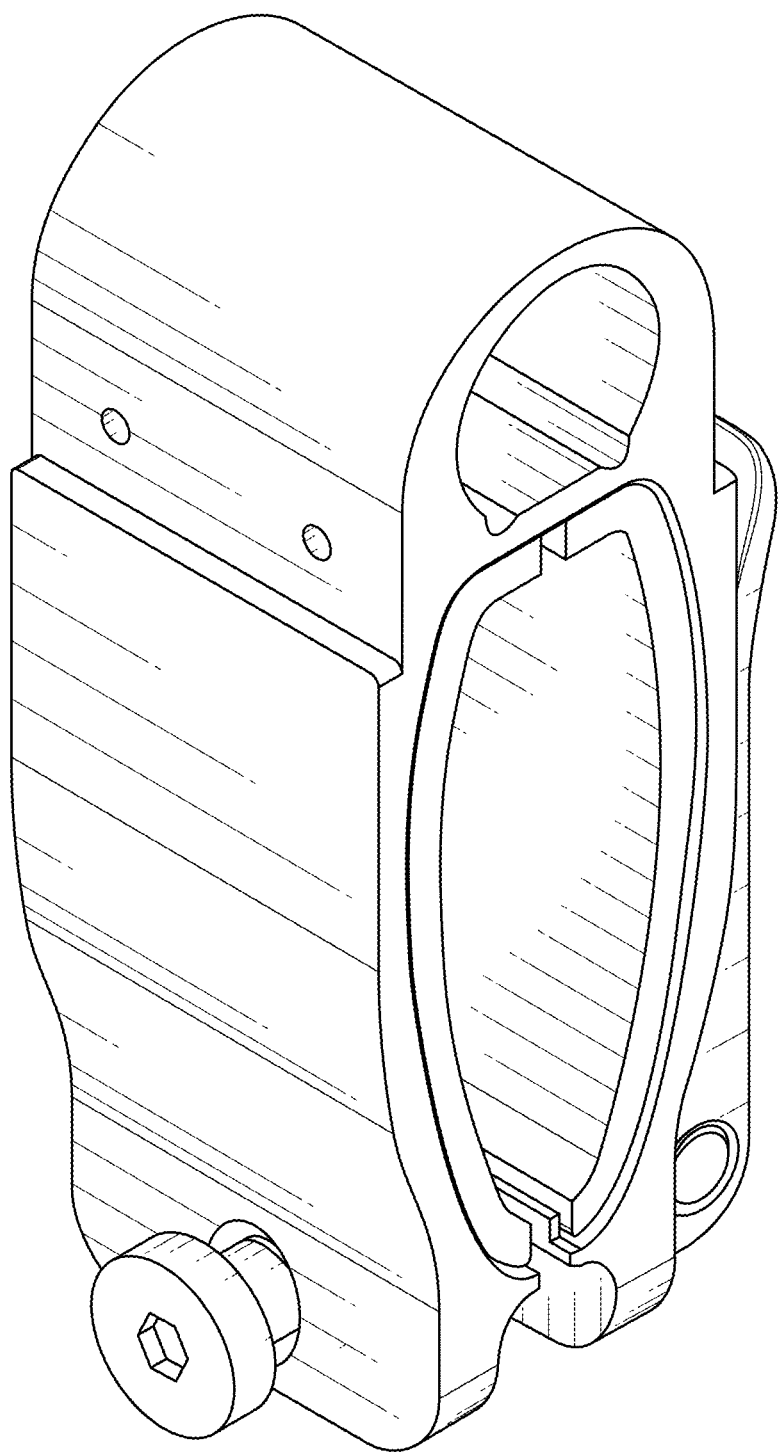
Figure 10B:
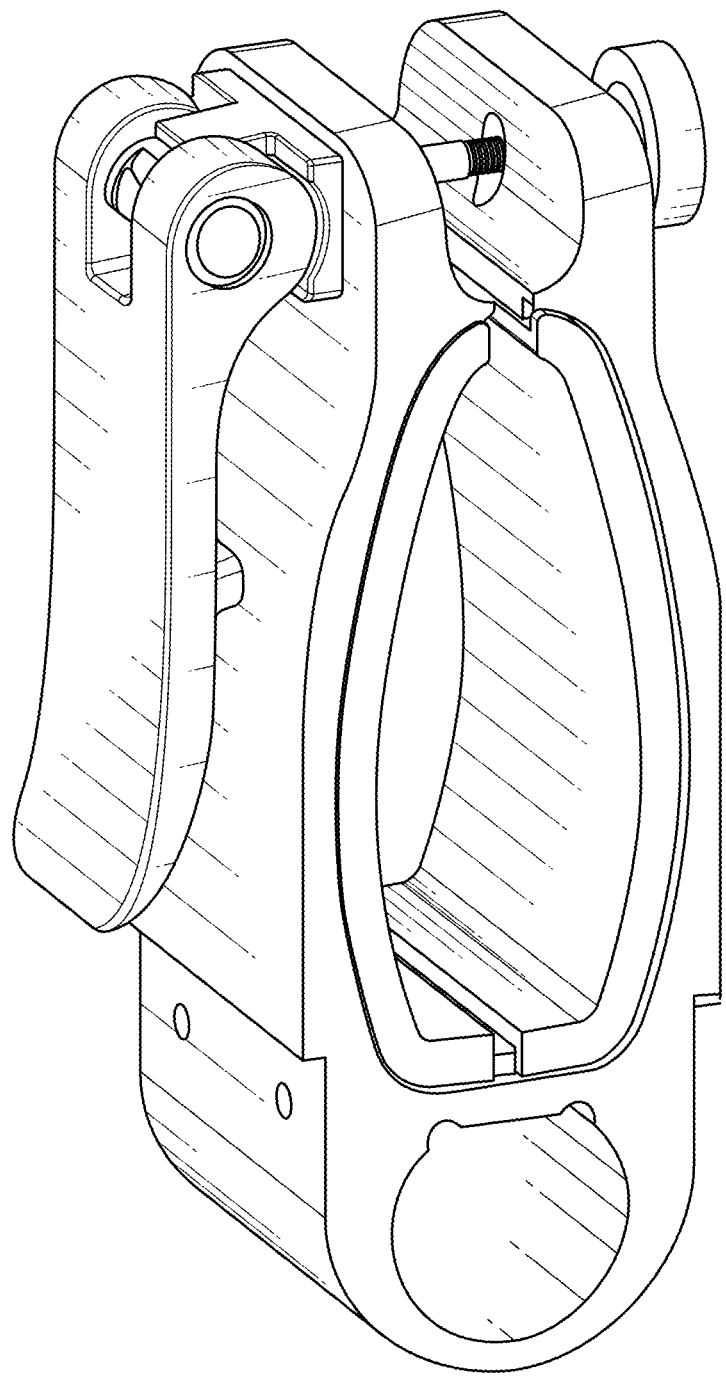
Figure 10C:
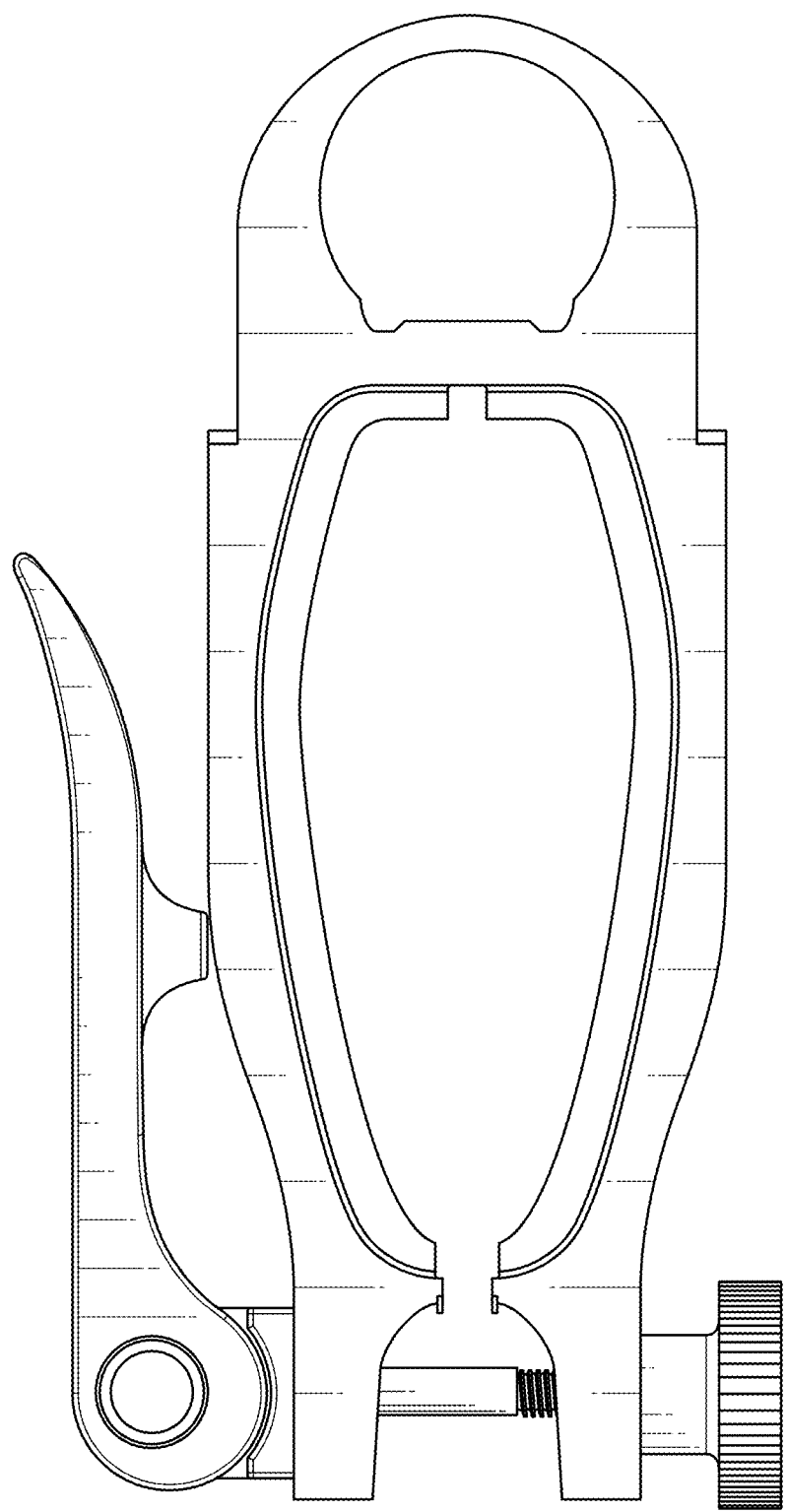
Figure 10D:
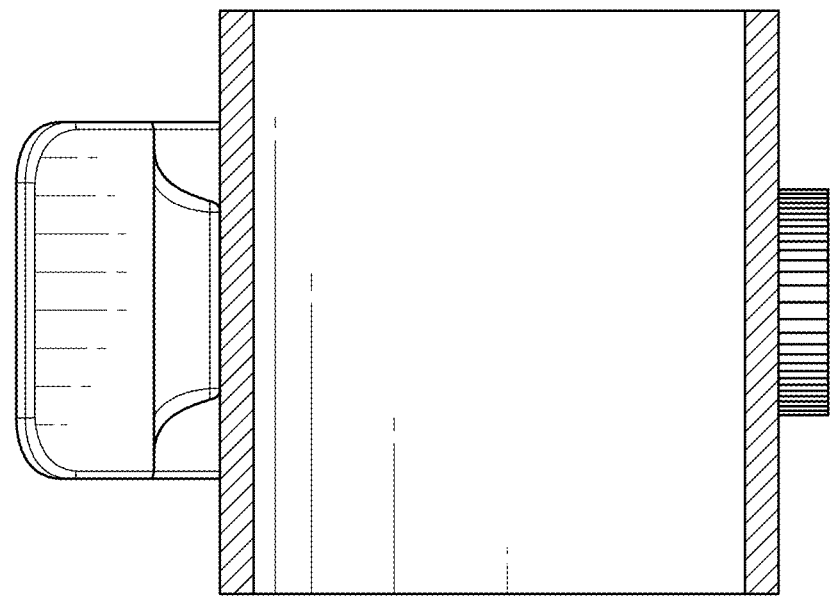
Figure 10E:
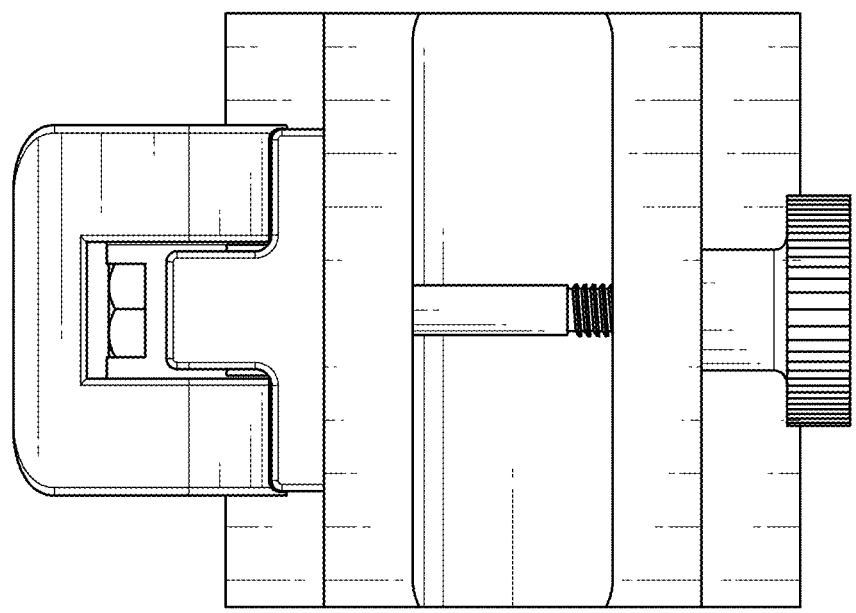
Figure 11A:
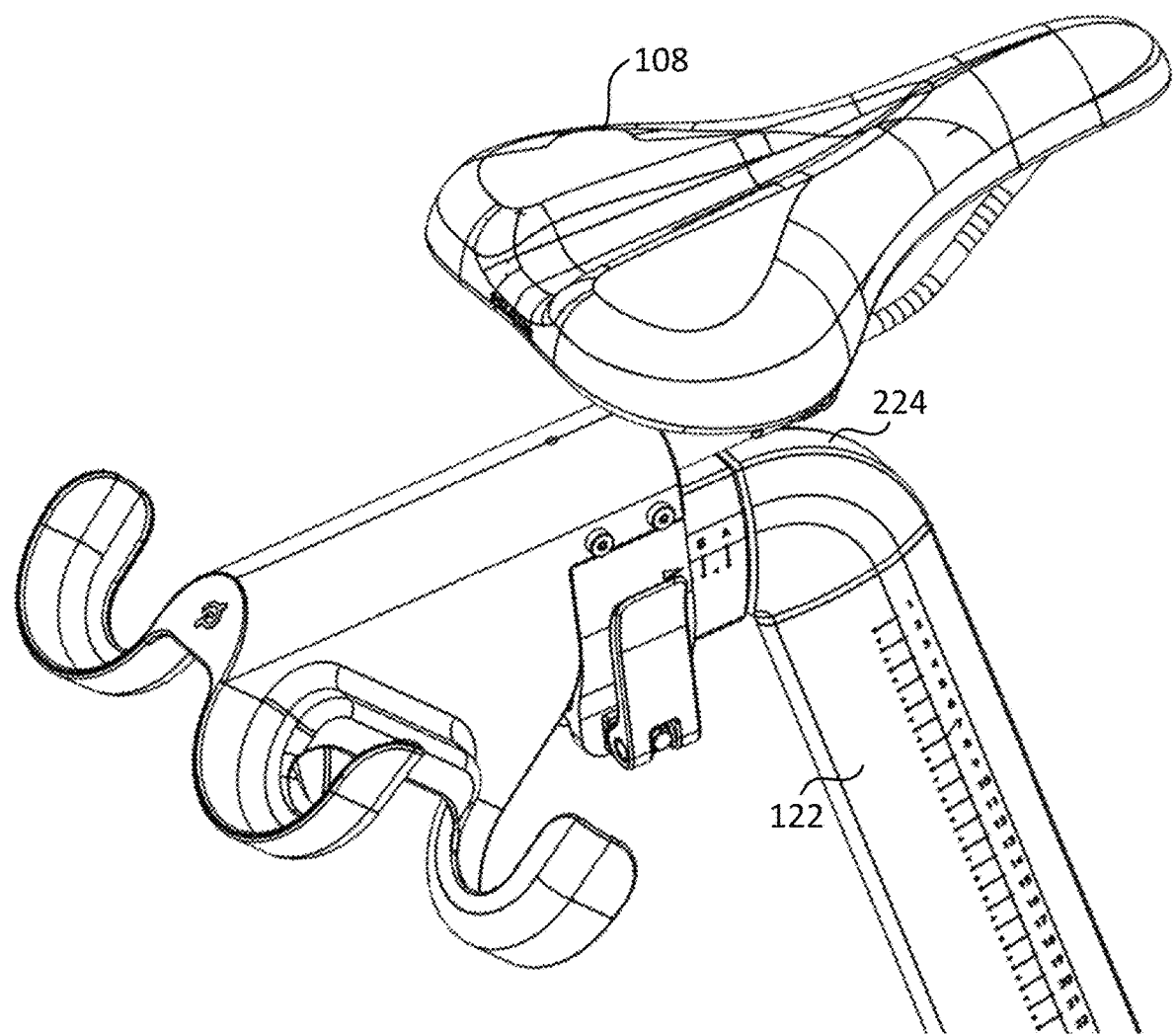
FIGS. 11a-11c illustrate various views of the seat assembly, in accordance with an embodiment of the disclosure.
Figure 11B:
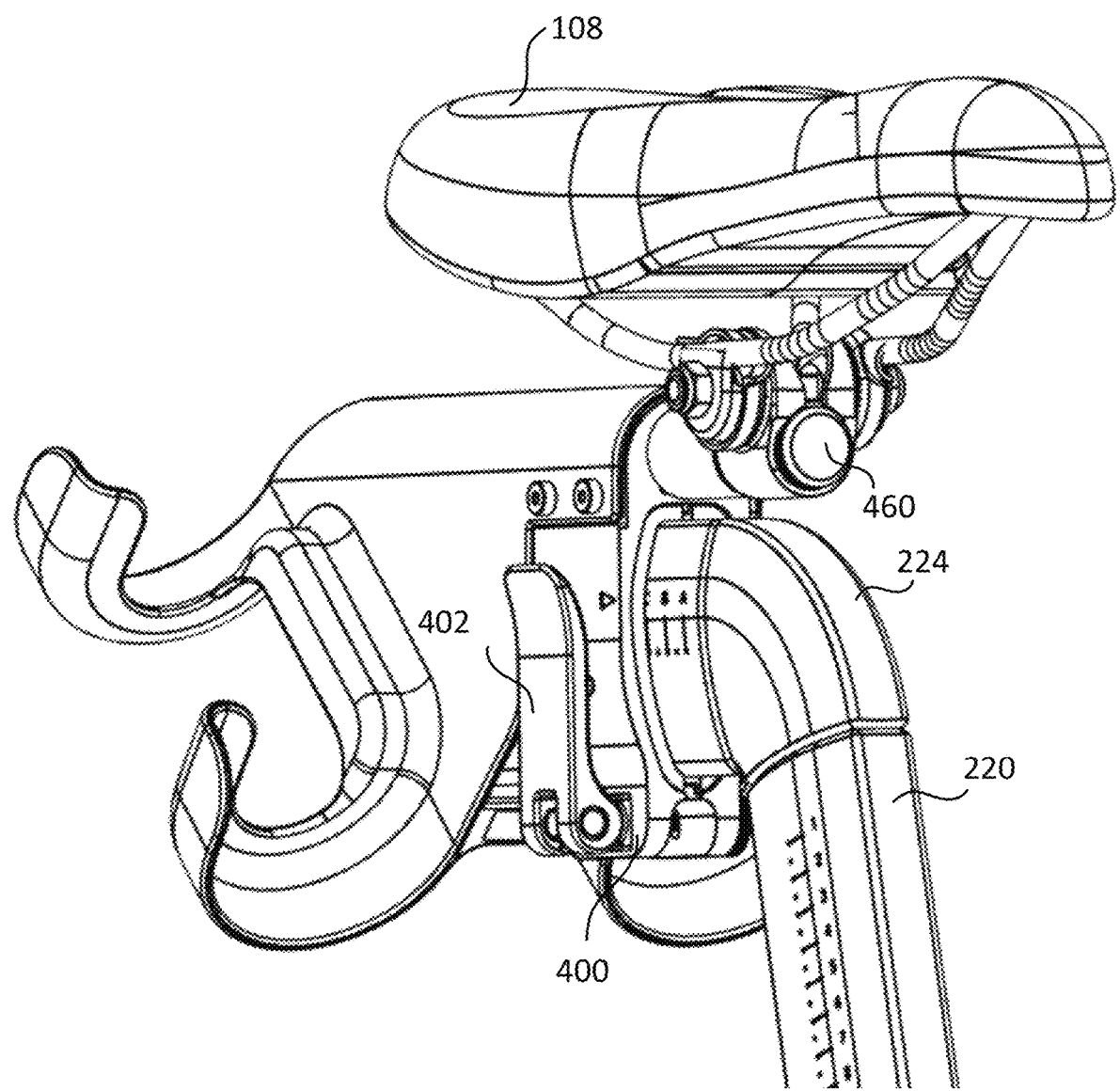
Figure 11C:
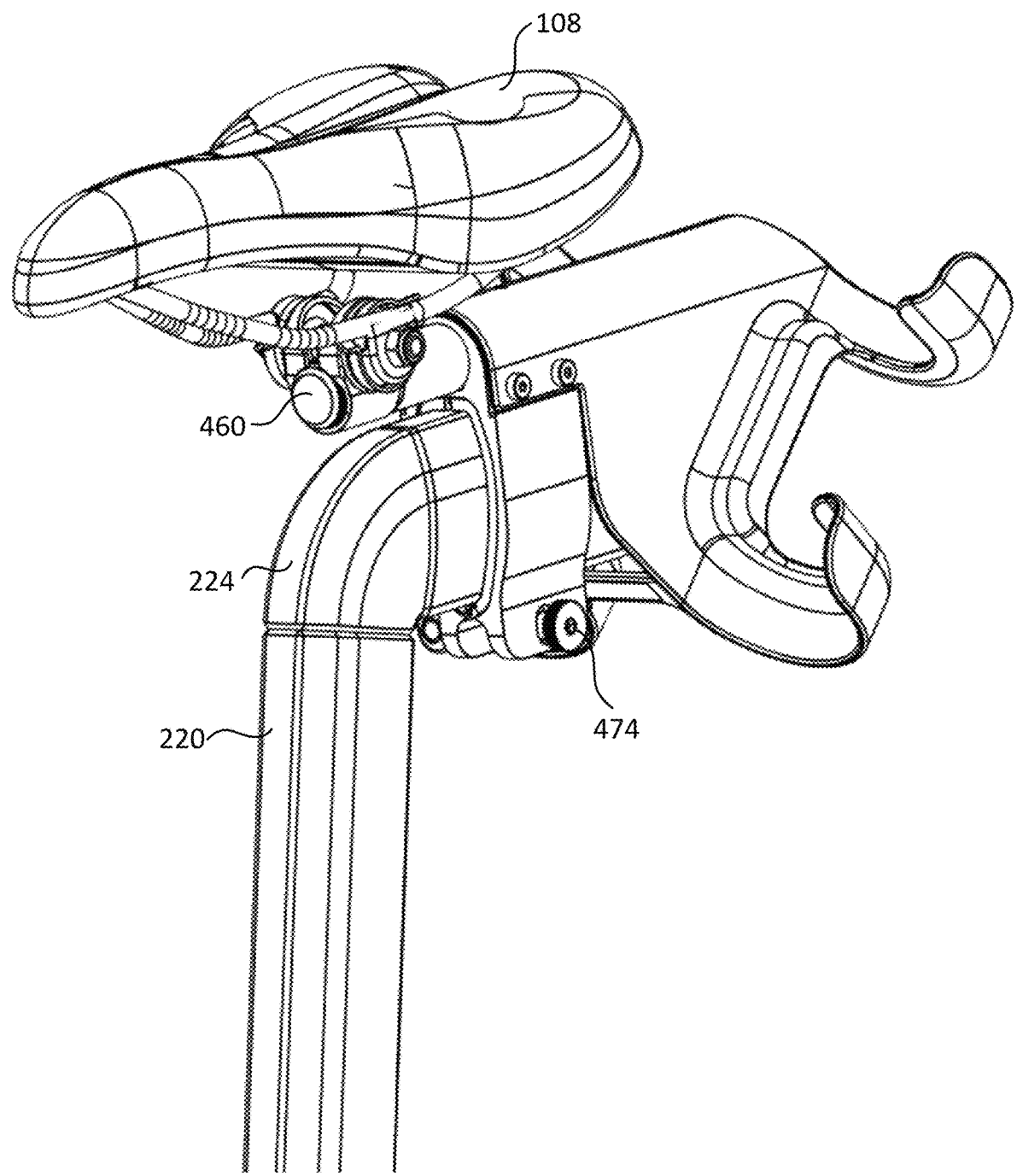
Figure 12A:
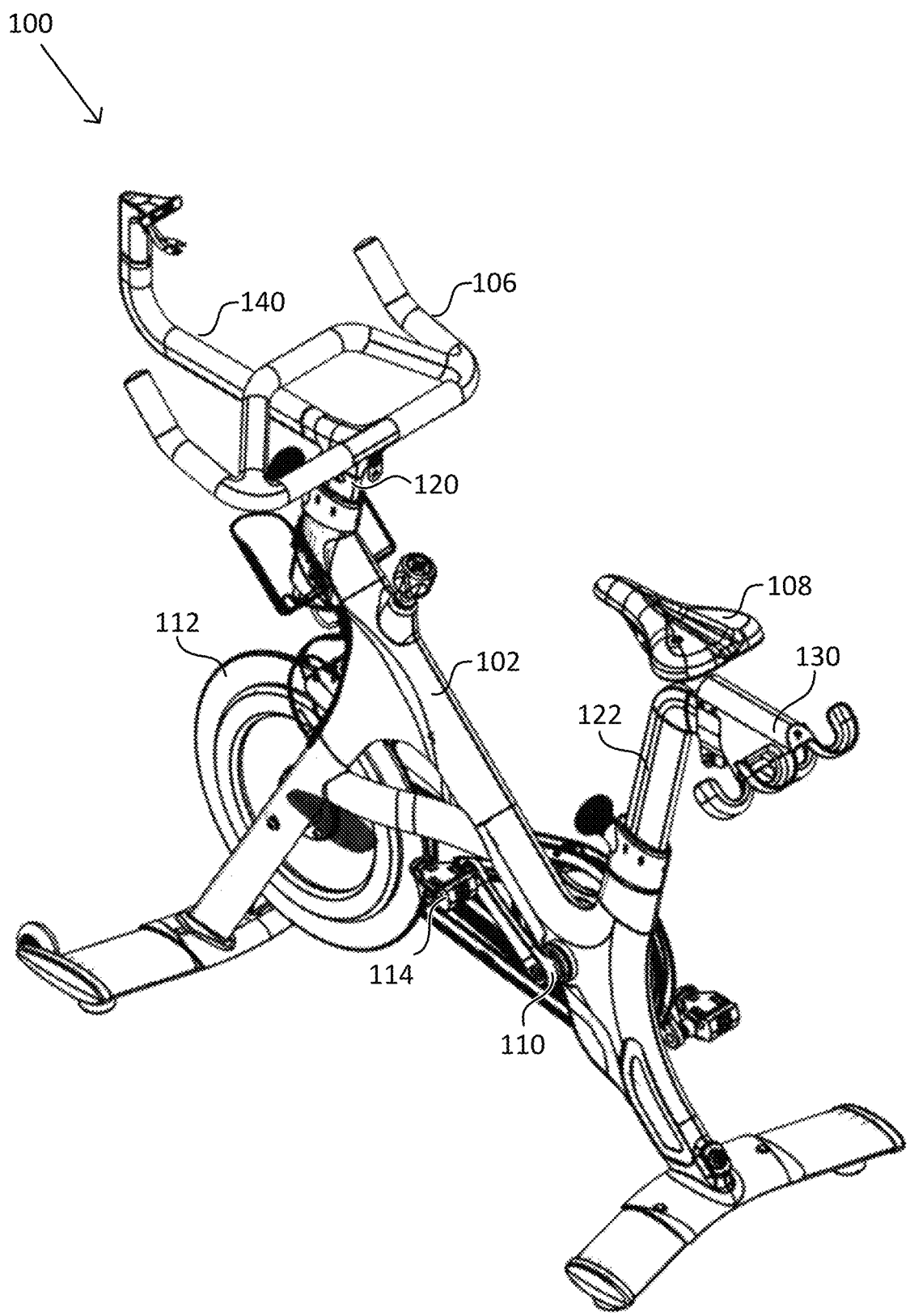
FIGS. 12a-12h and 13a-13h illustrate various views of the exercise device, in accordance with one or more embodiments of the disclosure.
Figure 12B:
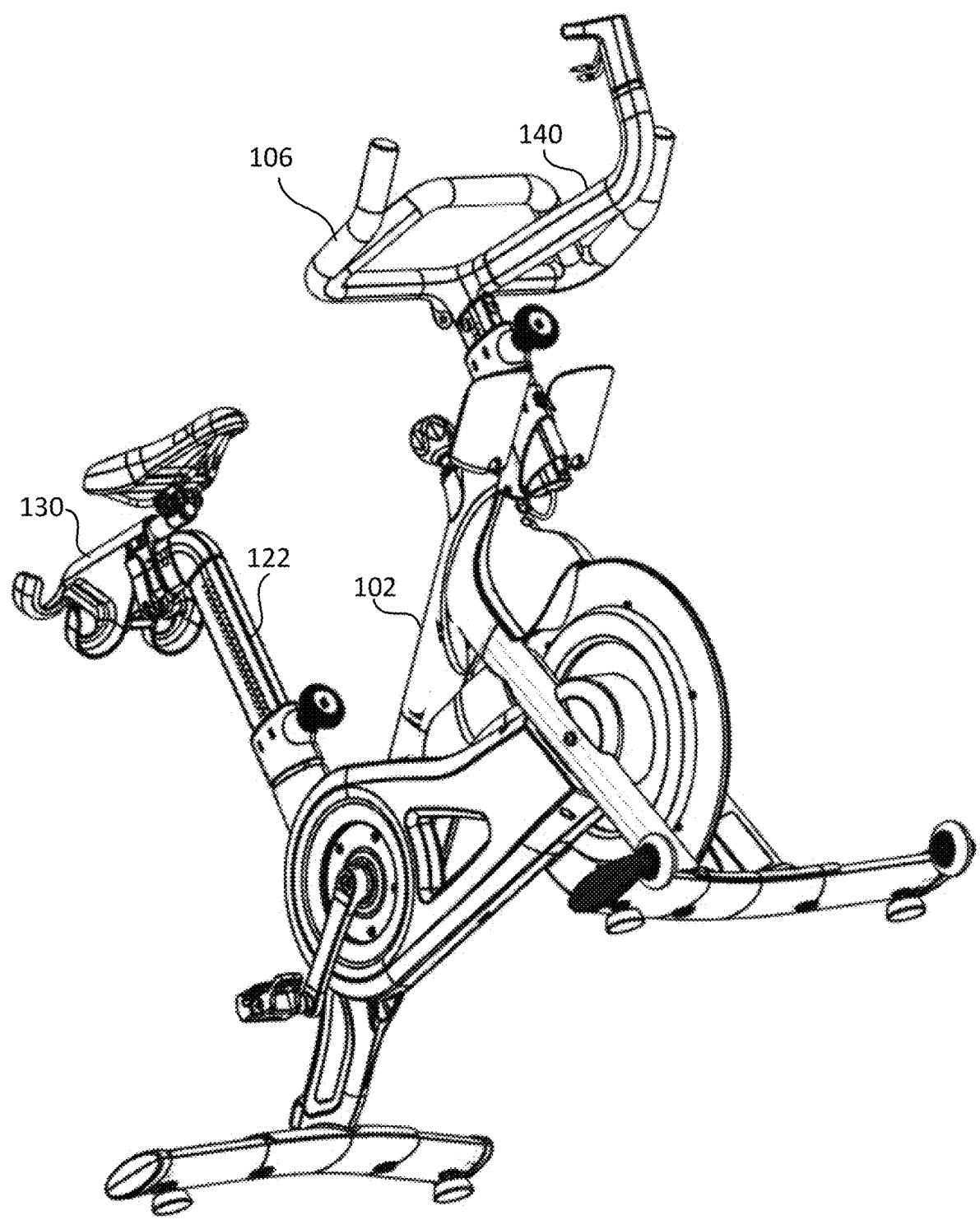
Figure 12C:
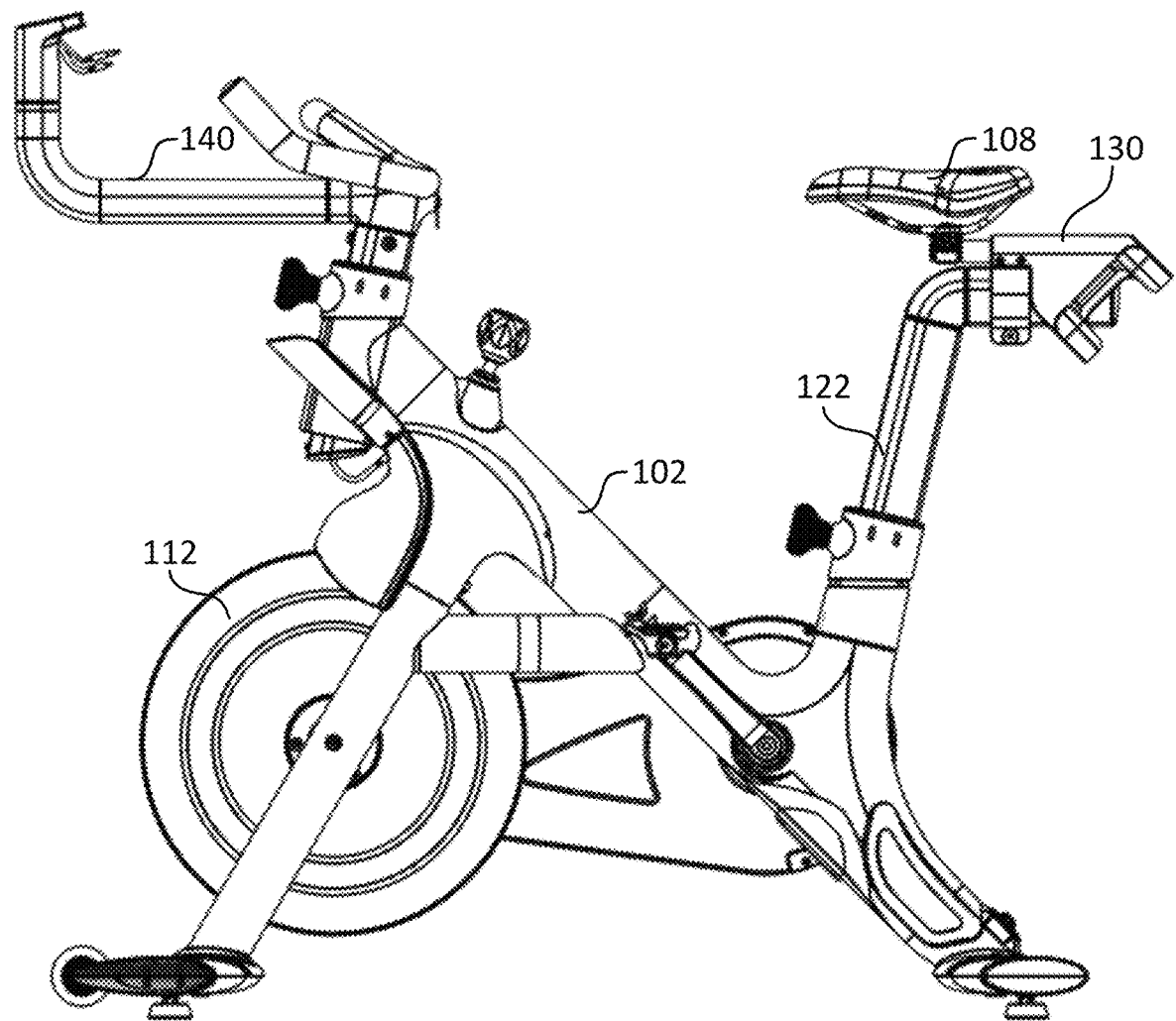
Figure 12D:
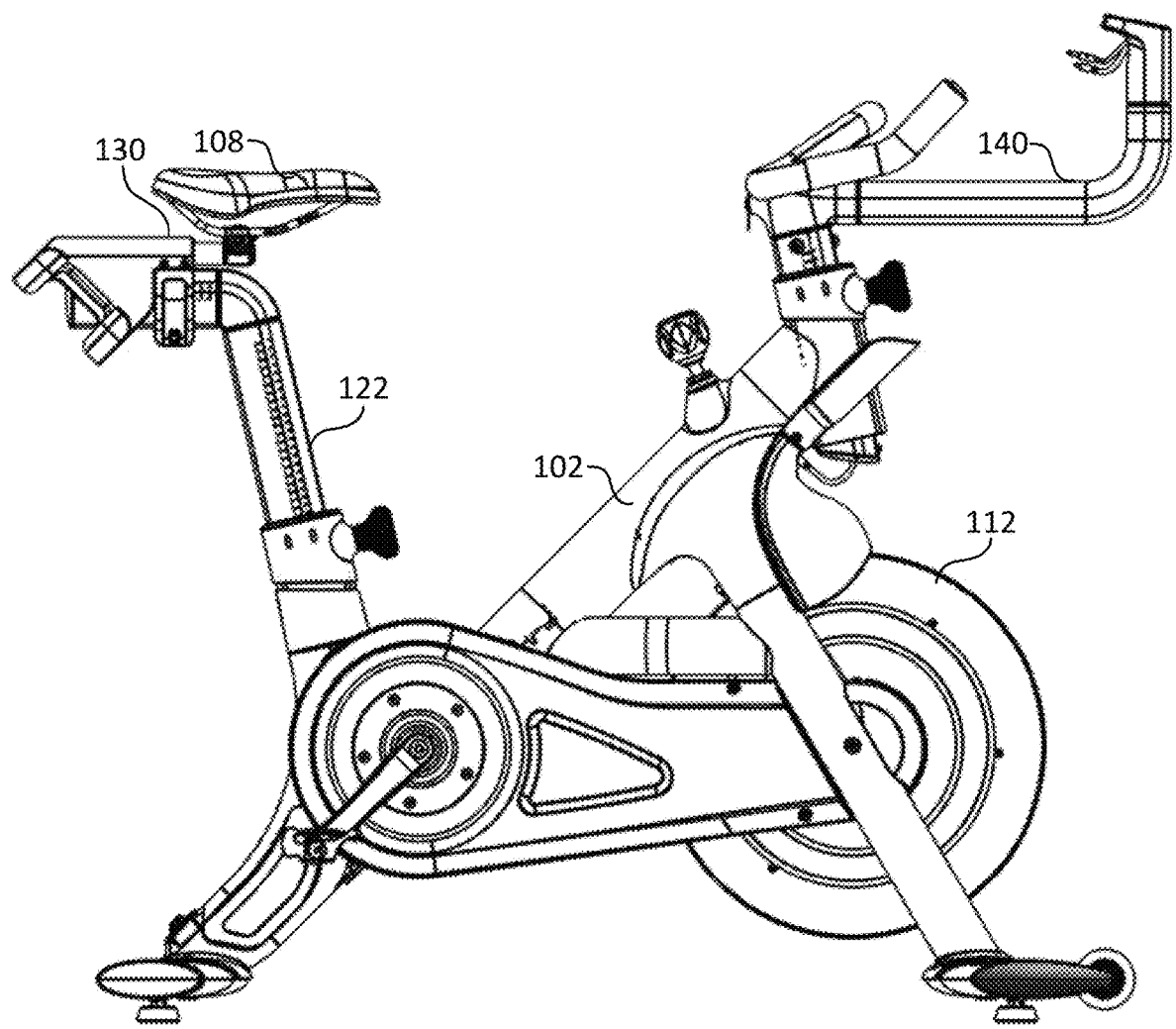
Figure 12E:
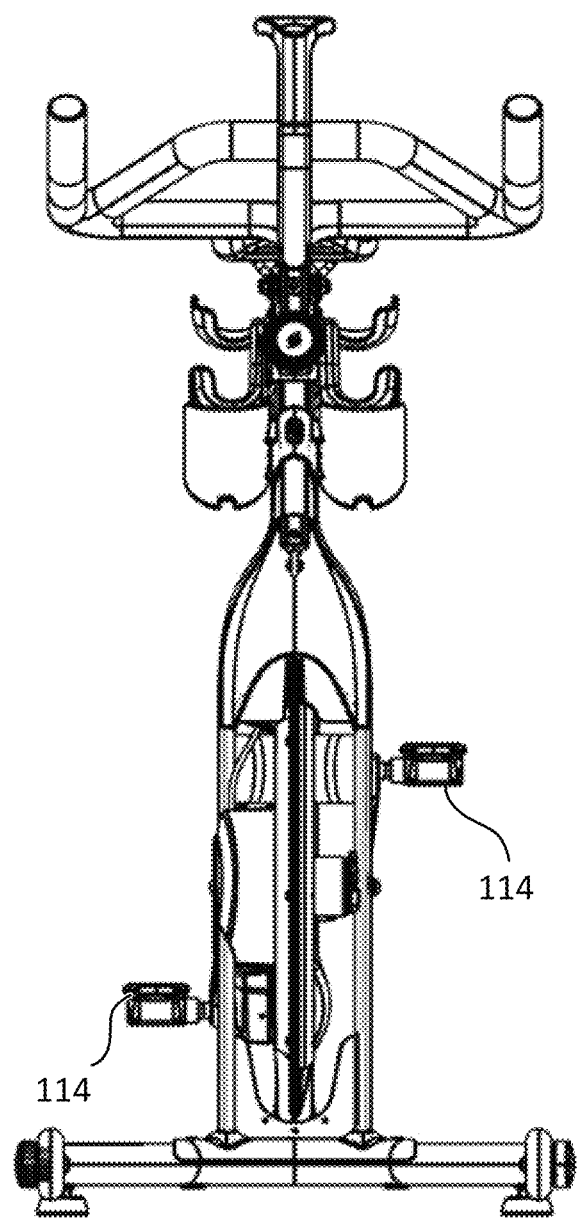
Figure 12F:
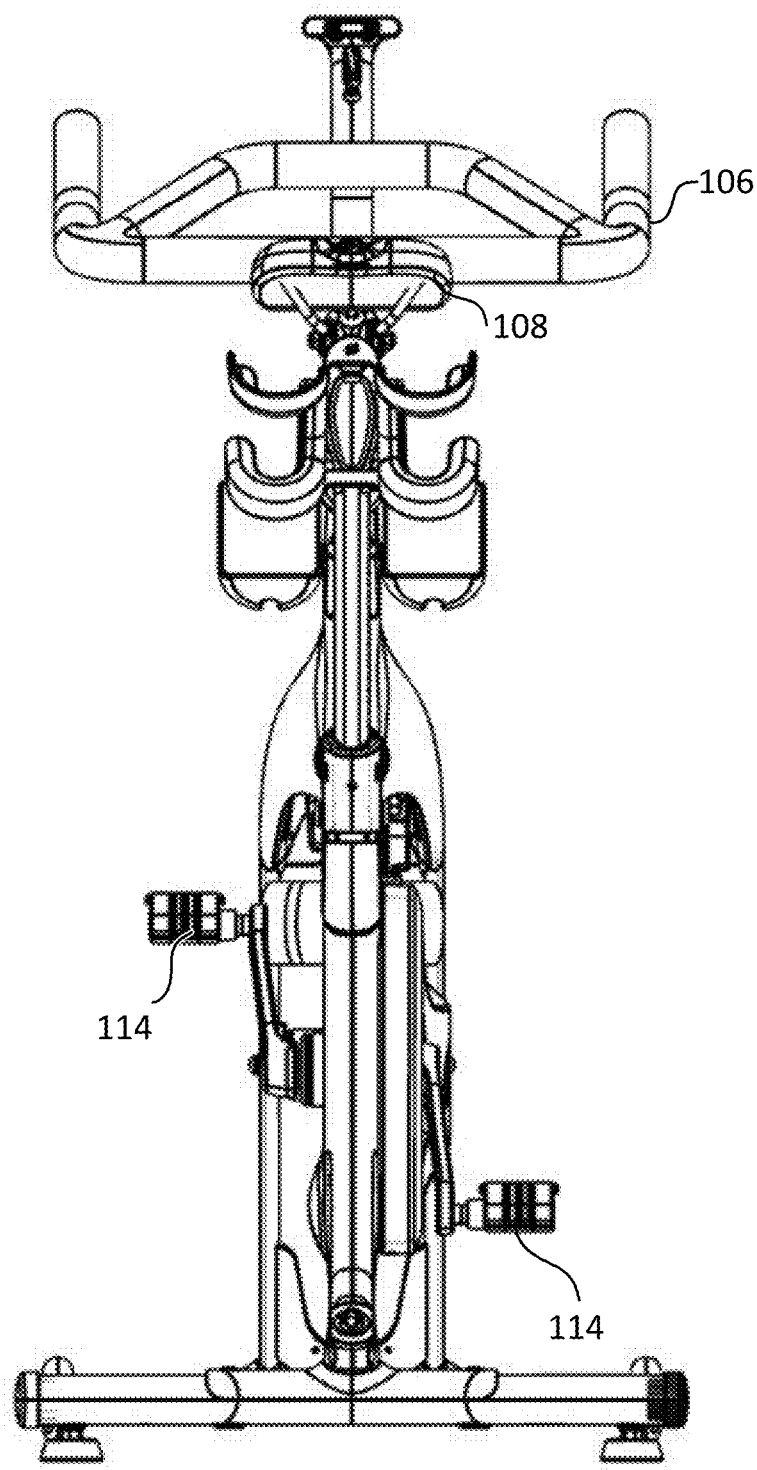
Figure 12G:
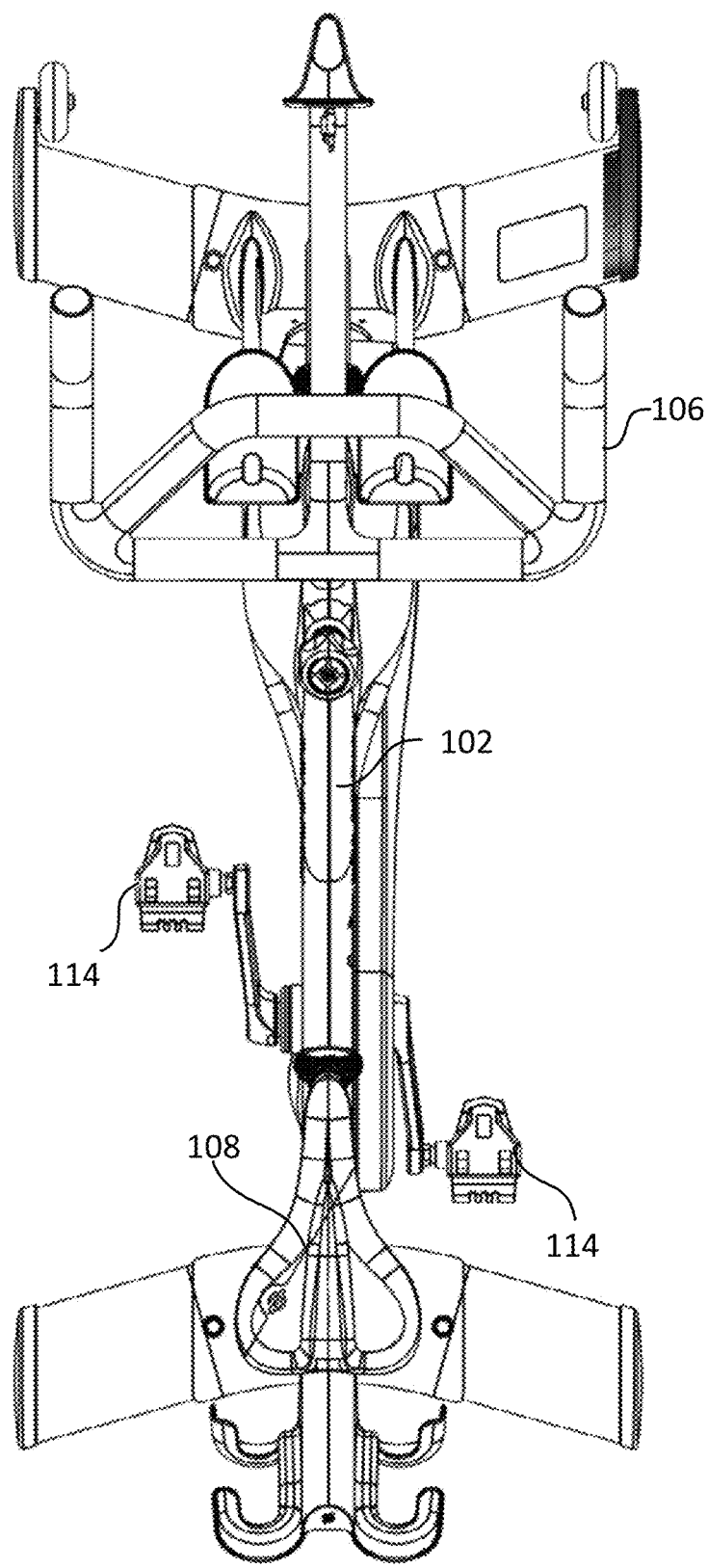
Figure 12H:
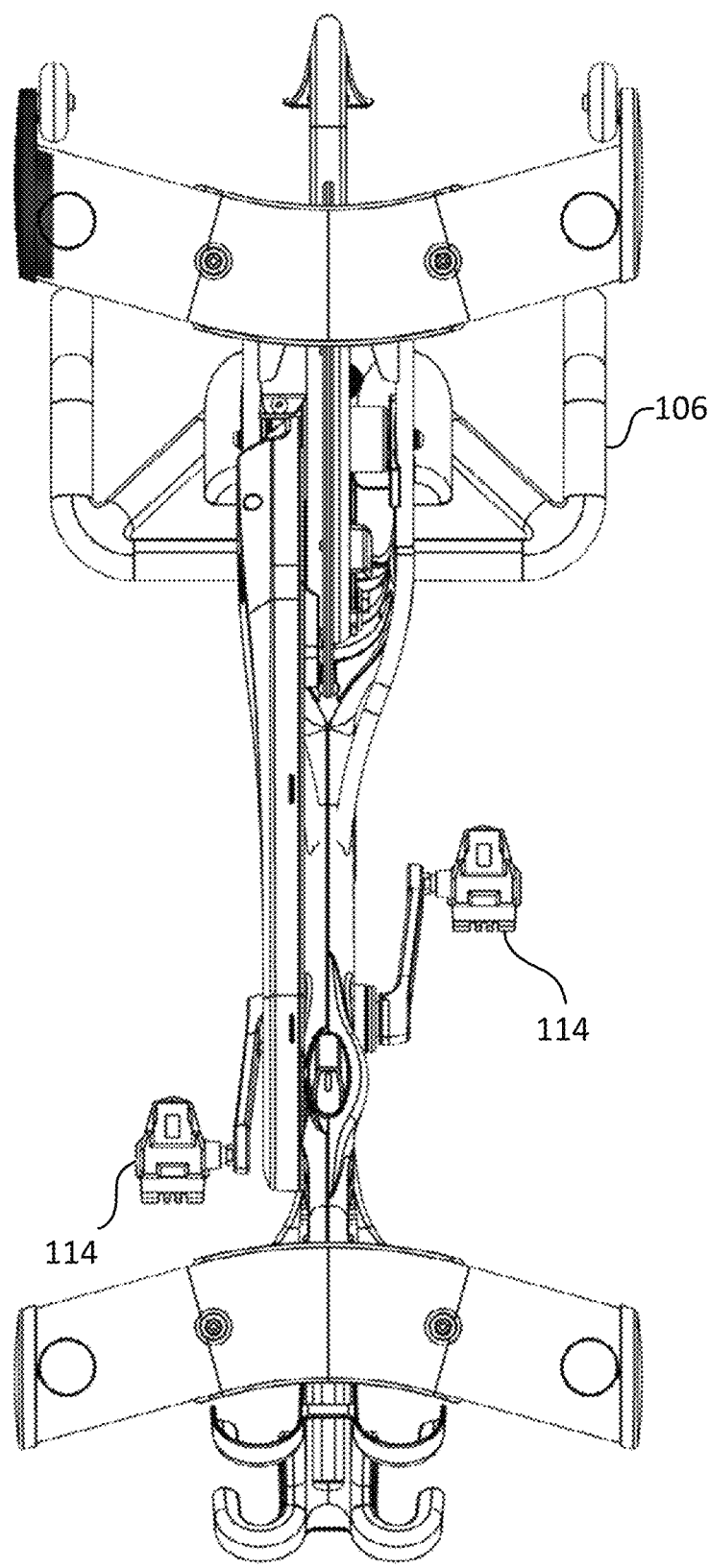
Figure 13A:
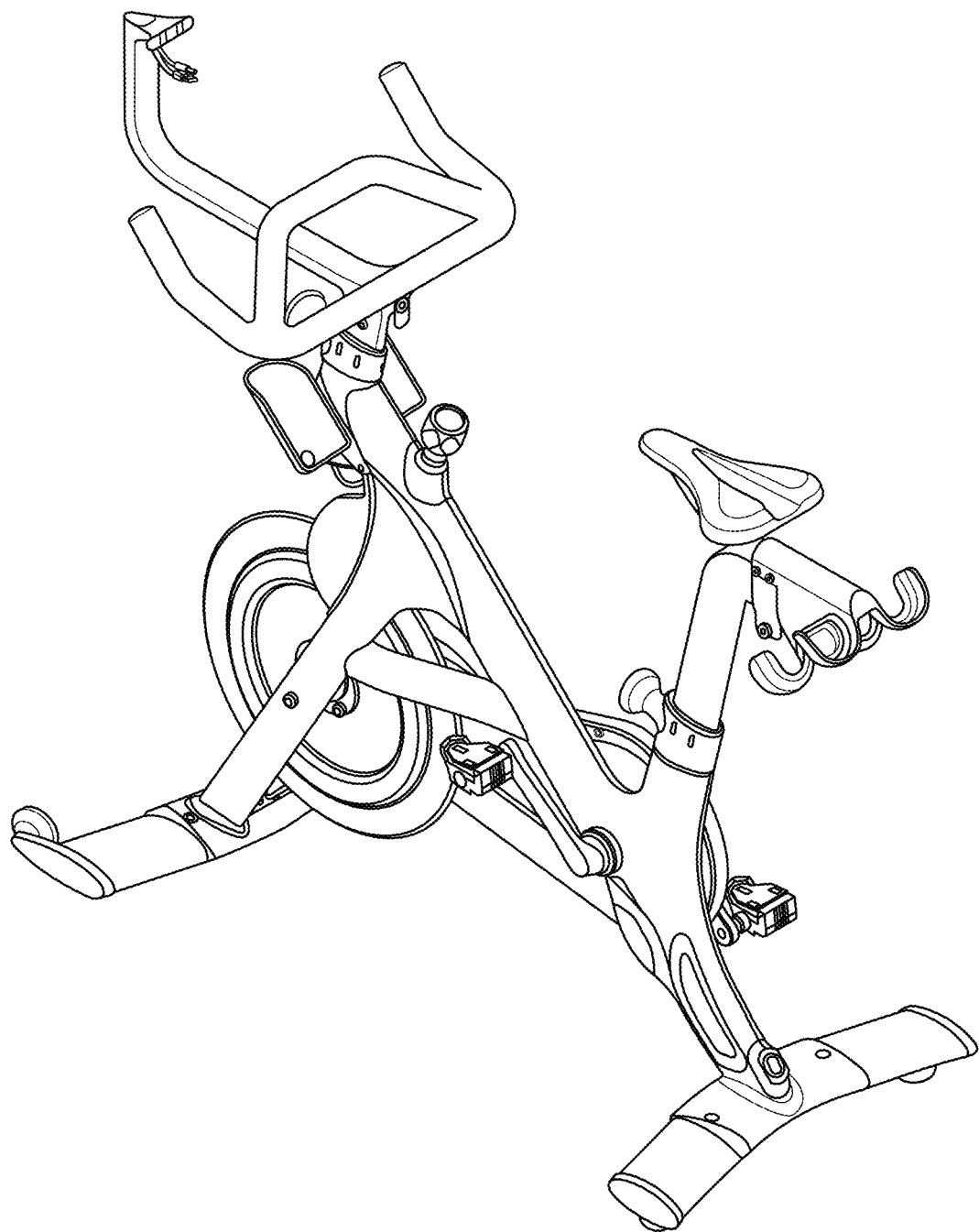
Figure 13B:
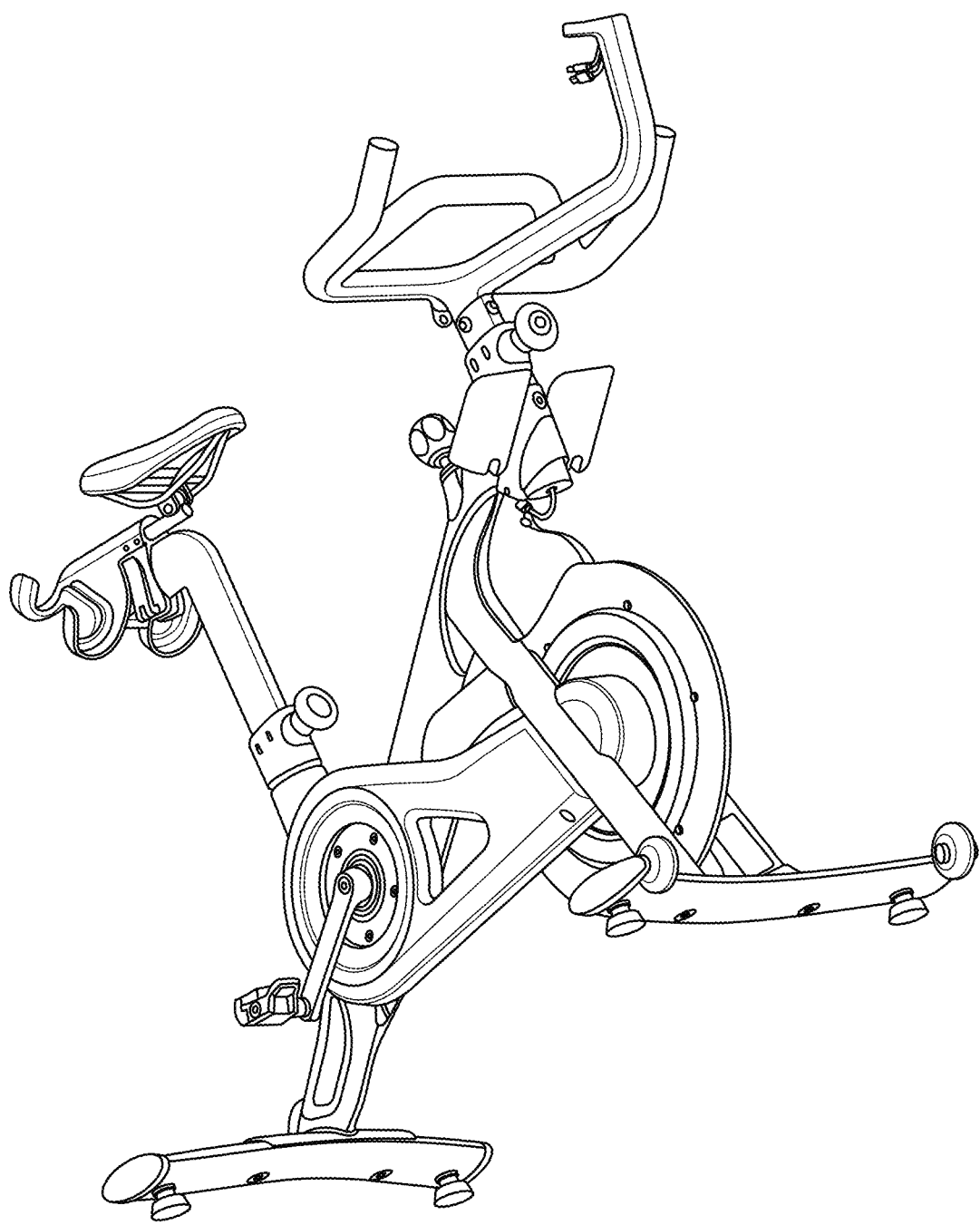
Figure 13C:
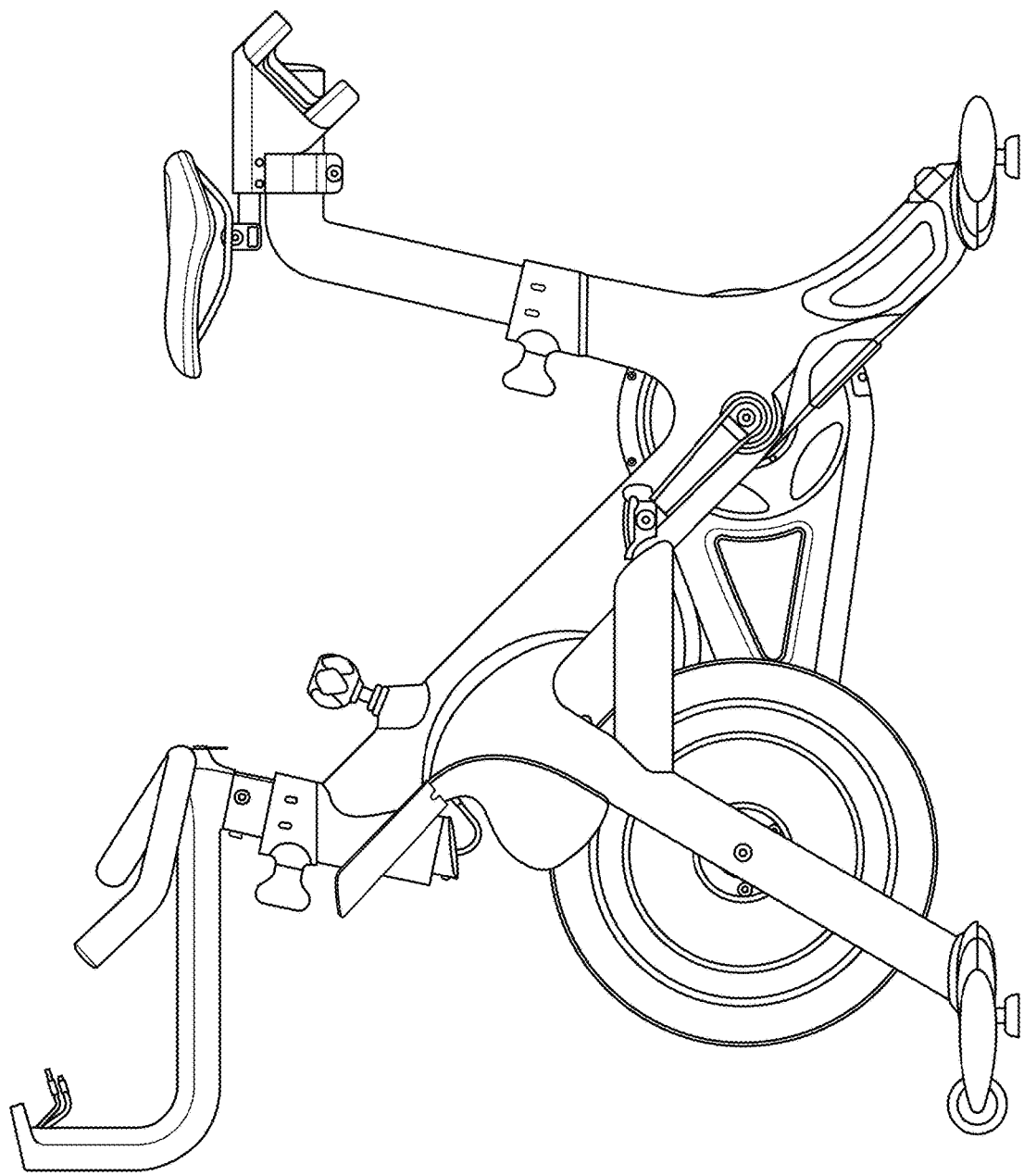
Figure 13D:
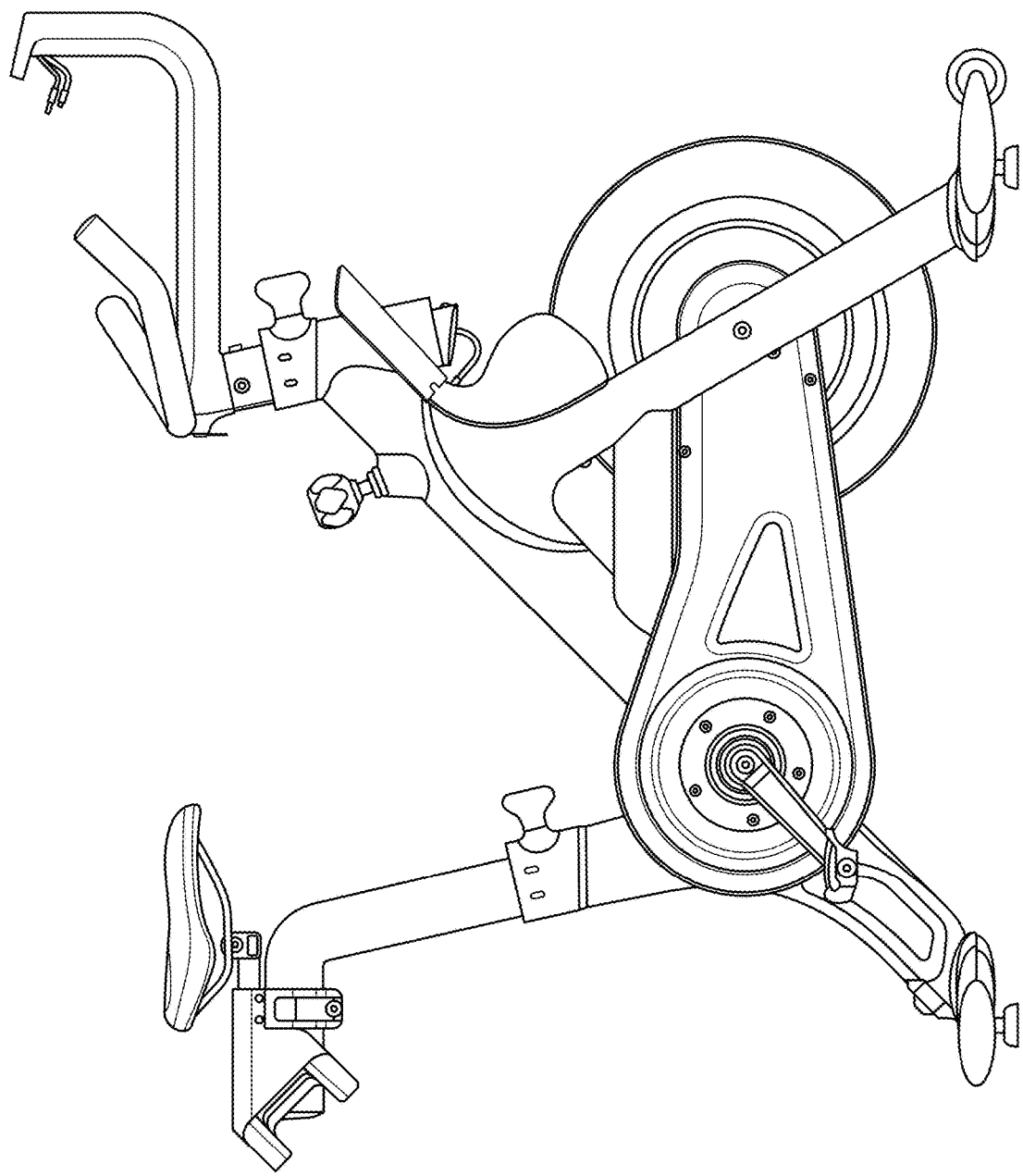
Figure 13E:
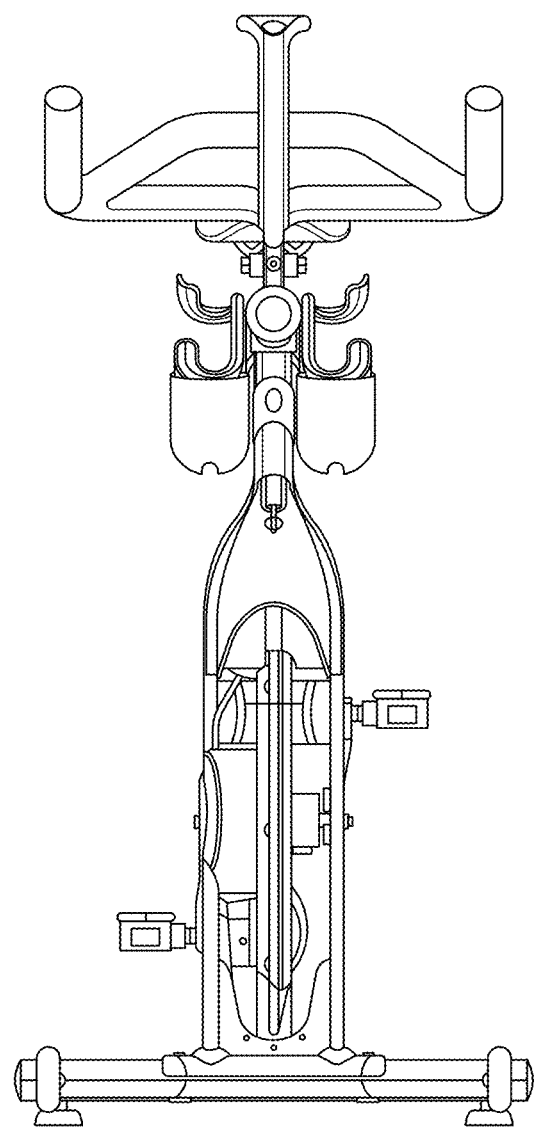
Figure 13F:
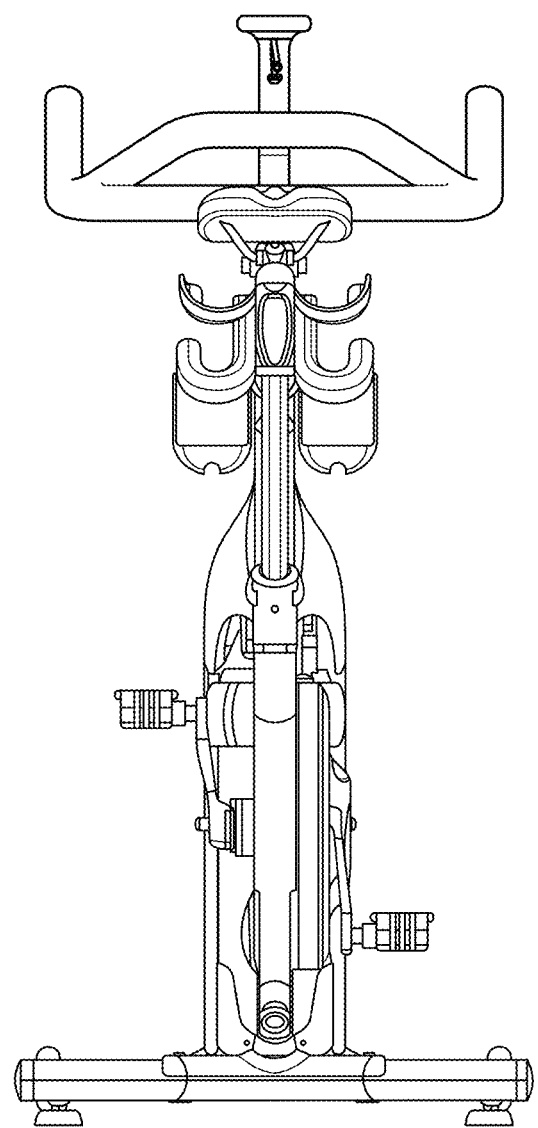
Figure 13G:
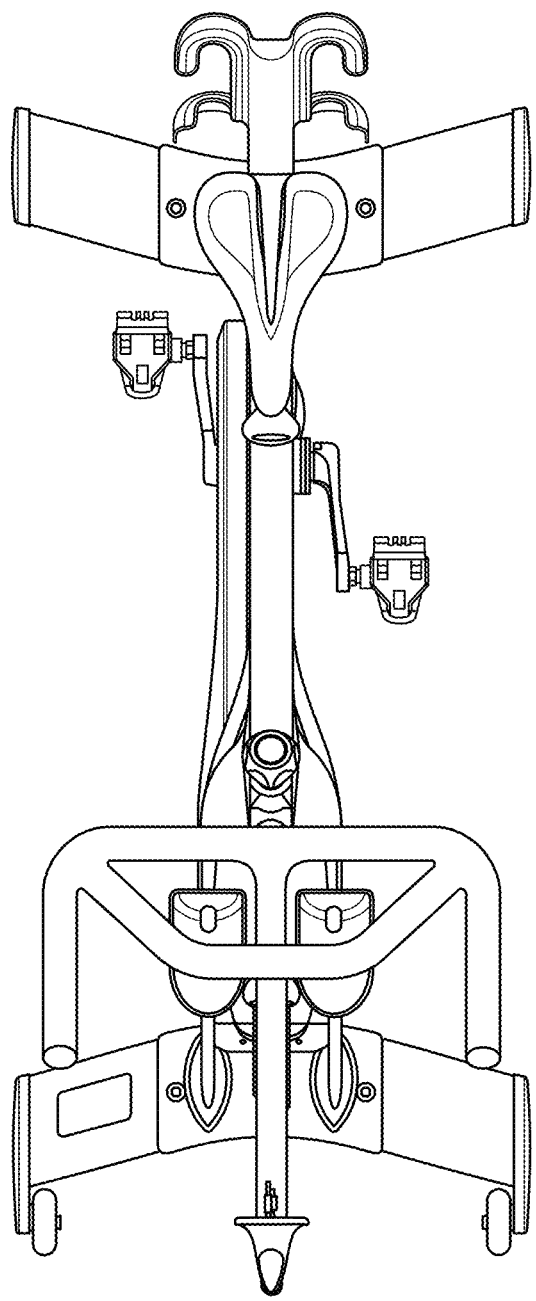
Figure 13H:
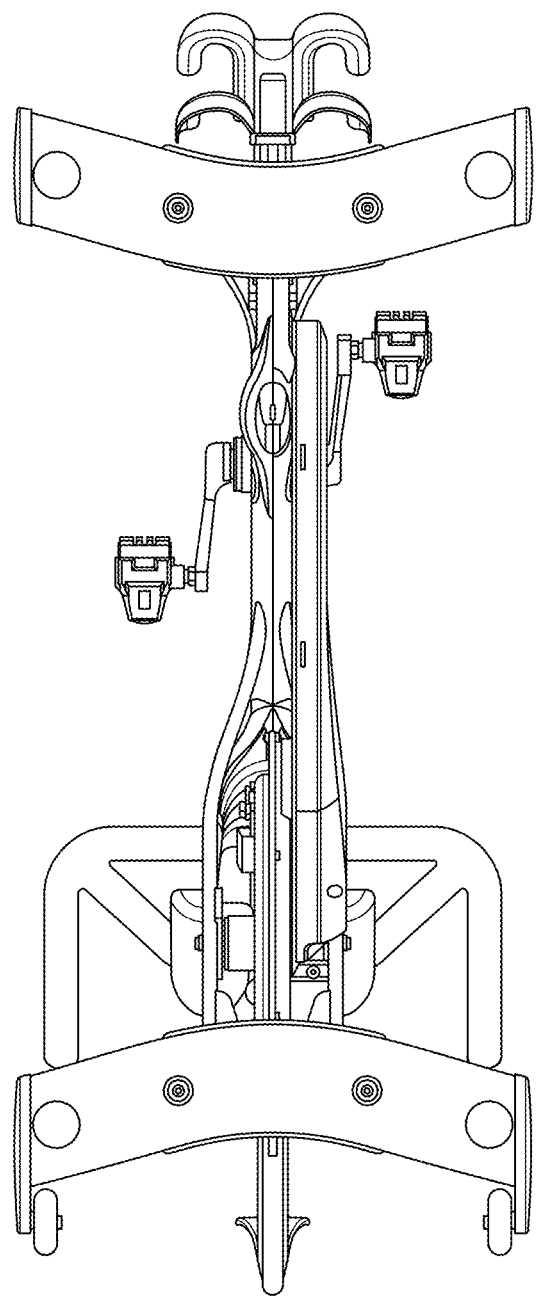

FIG. 8 illustrates a flow diagram of a process 800 of using a mounting system, such as slider assembly 210, in accordance with an embodiment of the disclosure. Any step, sub-step, sub-process, or block of process 800 may be performed in an order or arrangement different from the embodiments illustrated in FIG. 8. For example, one or more blocks may be omitted from or added to the process 800. Although process 800 is described with reference to the embodiments of FIGS. 1-7, process 800 may be applied to other embodiments.

In Block 802, process 800 may generally include securing a mounting system to a seat post of an exercise device. The mounting system may be a slider assembly, such as slider assembly 210. Block 802 may include inserting or adjusting the seat post within a slider of the slider assembly. Block 802 may further include securing the slider to the seat post via a cam mount, similar to cam mount 470 described above, or adjusting the seat assembly for a particular user's preference. In some embodiments, Block 802 may include securing a stop to the seat post to limit or prevent removal of the slider assembly from the seat post. In some embodiments, the stop may define an extent of slidable movement of the slider assembly along the seat post.

In Block 804, process 800 may include securing a seat to the mounting system (e.g., the slider assembly) or alternatively as in Block 802. For example, the seat may be secured to a saddle shaft extending from the slider of the slider assembly. In embodiments, Block 802 of Block 804 may include securing an accessory holder to the slider assembly. For instance, an accessory holder designed to store or support exercise equipment (e.g., dumbbells) may be secured to the slider of the slider assembly.

In Block 806, process 800 includes adjusting a position of the slider assembly along a seat post of an exercise device. Block 806 may include moving a cam of the slider assembly from a first position to a second position to release the slider assembly from the seat post. For example, moving the cam to the second position may unclamp a slider of the slider assembly from the seat post, such that the slider is free or generally free to slide along the seat post.

Block 806 may include sliding the slider assembly along the seat post to adjust a position of a seat connected to the slider assembly (in Block 804 the seat may be secured to the mounting system). The slider assembly may be slid along the seat post to adjust the seat to a user. For example, sliding the slider assembly along the seat post may adjust the seat closer to or further away from a handlebar of the exercise device to adjust the exercise device to a user.

In some embodiments, Block 806 may include moving the cam of the slider assembly from the second position to the first position to set the position of the slider assembly along the seat post. For instance, moving the cam lever to the first position may clamp or lock the slider of the slider assembly to the seat post.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A seat assembly comprising:
    a slider comprising an open end defined between a first arm and a second arm thereof, and a cutout disposed in the first arm or the second arm;
    a cam coupled to the slider and movable between a first position and a second position;
    a saddle shaft coupled to the slider; and
    a cam washer being substantially rectangularly shaped and positioned between the cam and the slider, the cam washer comprising:
        a base seated within the cutout disposed in the slider, the base having a non-circular shape for engagement with a complementary shape of the cutout, and a tab extending from the base, the tab seated within the cam.

2. The seat assembly of claim 1, wherein:
the base seated within the cutout limits rotational movement of the cam washer relative to the slider; and
the tab seated within the cam limits rotational movement of the cam relative to the cam washer.

3. The seat assembly of claim 2, wherein the engagement of the cam washer with the cam and the slider constrains movement of the cam to a single plane relative to the slider.

4. The seat assembly of claim 1, wherein:
the cam comprises a pair of tabs that define a space therebetween; and
the tab extends at least partially within the space defined between the pair of tabs.

5. The seat assembly of claim 4, further comprising:
a pin seated within the pair of tabs, such that the cam rotates about the pin between the first position and the second position, the tab including an arcuate shape to receive or at least partially extend around the pin;
a bolt extending through the pin, the cam washer, and the first and second arms of the slider; and
a nut threaded to the bolt to adjust a tension provided by the cam.

6. The seat assembly of claim 1, wherein:
the first position compresses the open end to secure the slider to a seat post of an exercise device; and
the second position expands the open end to allow positioning of the slider along the seat post.

7. An exercise device comprising the seat assembly of claim 1, the exercise device further comprising:
a seat coupled to the saddle shaft; and
a seat post, the slider coupled to the seat post to adjust a position of the seat along the seat post.

8. A method of using the seat assembly of claim 1, the method comprising:
moving the cam to the first position to release the slider from a seat post of an exercise device;
sliding the seat assembly along the seat post; and
moving the cam to the second position to secure the slider to the seat post.

9. A slider assembly for adjusting a position of a seat along a seat post, the slider assembly comprising:
a slider configured to slide along the seat post and movable between a first configuration clamping the slider to the seat post and a second configuration allowing sliding movement of the slider along the seat post, the slider comprising an open end defined between a first arm and a second arm thereof, and a cutout disposed in the first arm or the second arm;
a cam coupled to the slider and movable to move the slider between the first configuration and the second configuration; and
a cam washer being substantially rectangularly shaped and engaging the slider and the cam to limit a movement of the cam relative to the slider, wherein the cam washer comprises:
a base seated within the cutout disposed in the slider, the base having a non-circular shape for engagement with a complementary shape of the cutout, and
a tab seated within the cam.

10. The slider assembly of claim 9, wherein:
the base seated within the cutout limits rotational movement of the cam washer relative to the slider; and
the tab seated within the cam limits rotational movement of the cam relative to the cam washer.

11. The slider assembly of claim 9, wherein the engagement of the cam washer with the slider and the cam limits movement of the cam to a single plane relative to the slider.

12. The slider assembly of claim 9, wherein:
the cam comprises a pair of tabs that define a space therebetween; and
the tab extends at least partially within the space defined between the pair of tabs.

13. The slider assembly of claim 9, wherein:
the cam moves the first arm and the second arm towards each other to compress the open end to clamp the slider to the seat post in the first configuration; and
the cam moves the first arm and the second arm away from each other to expand the open end to release the slider from the seat post in the second configuration.

14. The slider assembly of claim 9, further comprising a saddle shaft coupled to the slider to couple the seat to the slider assembly.

15. An exercise device comprising the slider assembly of claim 14, the exercise device further comprising:
the seat coupled to the saddle shaft; and
the seat post, the slider coupled to the seat post to adjust a position of the seat along the seat post.

16. An exercise device comprising:
a seat post; and
a seat assembly coupled to the seat post and comprising:
a slider coupled to the seat post and configured to slide along the seat post, the slider comprising an open end defined between a first arm and a second arm thereof, and a cutout disposed in the first arm or the second arm,
a cam coupled to the slider and movable between a first position and a second position, and
a cam washer being substantially rectangularly shaped and positioned between the cam and slider, the cam washer comprising:
a base seated within the cutout disposed in the slider, the base having a non-circular shape for engagement with a complementary shape of the cutout, and
a tab extending from the base, the tab seated within the cam.

17. The exercise device of claim 16, wherein:
the base seated within the cutout limits rotational movement of the cam washer relative to the slider; and
the tab seated within the cam limits rotational movement of the cam relative to the cam washer, such that movement of the cam is constrained to a single plane relative to the slider.

18. The exercise device of claim 16, wherein:
the cam comprises a pair of tabs that define a space therebetween; and
the tab extends at least partially within the space defined between the pair of tabs.

19. The exercise device of claim 18, further comprising:
a pin seated within the pair of tabs, such that the cam rotates about the pin between the first position and the second position, the tab including an arcuate shape to receive or at least partially extend around the pin;
a bolt extending through the pin, the cam washer, and the first and second arms of the slider; and
a nut threaded to the bolt to adjust a tension provided by the cam.

20. A method of assembling the exercise device of claim 16, the method comprising:
positioning the cam washer between the cam and the slider;

coupling the cam to the slider; and
coupling the slider to the seat post.

\* \* \* \* \*

UNITED STATES PATENT AND TRADEMARK OFFICE
CERTIFICATE OF CORRECTION

PATENT NO. : 12,251,598 B2  
APPLICATION NO. : 18/105192  
DATED : March 18, 2025  
INVENTOR(S) : Claudia Moreira and Mark Kruse Page 1 of 1

It is certified that error appears in the above-identified patent and that said Letters Patent is hereby corrected as shown below:

In the Specification

In the CROSS-REFERENCE TO RELATED APPLICATIONS:

Column 1, Lines 6-7, change "U.S. application Ser. No." to --U.S. Application No.--.

In the DETAILED DESCRIPTION:

Column 4, Line 36, change "U.S. patent application Ser. No." to --U.S. Patent Application No.--.

Column 4, Line 57, change "U.S. patent application Ser. No." to --U.S. Patent Application No.--.

Signed and Sealed this  
Twenty-seventh Day of May, 2025

Coke Morgan Stewart  
*Acting Director of the United States Patent and Trademark Office*